United States Patent
Keller et al.

(10) Patent No.: US 12,098,975 B2
(45) Date of Patent: Sep. 24, 2024

(54) METHODS, SYSTEMS, AND APPARATUSES FOR NON-DESTRUCTIVELY INSPECTING, DETECTING, AND MEASURING STRUCTURAL COMPONENT INTERNAL DEFORMATION AND STRAIN BY CORRELATING DENSITY VARIATIONS OF INDUCED MATERIAL DENSITY PATTERNS

(71) Applicant: The Boeing Company, Chicago, IL (US)

(72) Inventors: Russell L. Keller, Maple Valley, WA (US); Gary E. Georgeson, Tacoma, WA (US); Kenneth H. Griess, Kent, WA (US)

(73) Assignee: THE BOEING COMPANY, Arlington, VA (US)

( * ) Notice: Subject to any disclaimer, the term of this patent is extended or adjusted under 35 U.S.C. 154(b) by 26 days.

(21) Appl. No.: 17/578,992

(22) Filed: Jan. 19, 2022

(65) Prior Publication Data
US 2022/0268663 A1    Aug. 25, 2022

Related U.S. Application Data

(60) Provisional application No. 63/152,376, filed on Feb. 23, 2021.

(51) Int. Cl.
*G01M 5/00* (2006.01)
*G01N 21/3581* (2014.01)

(52) U.S. Cl.
CPC ...... *G01M 5/0041* (2013.01); *G01N 21/3581* (2013.01)

(58) Field of Classification Search
CPC .... G01B 11/165; G01B 11/16; G01M 5/0041; G01M 5/0091; G01M 5/0016; G01M 5/0066; G01L 1/24; G01L 1/183; G01L 1/246; G01N 2291/0231; G01N 21/3581; G01N 2291/044; G01N 2291/2694; G01N 29/043; G01N 29/11; G01N 29/348
See application file for complete search history.

(56) References Cited

U.S. PATENT DOCUMENTS

| | | | |
|---|---|---|---|
| 7,041,960 B2 * | 5/2006 | Sato | G01M 5/0033 385/12 |
| 7,876,423 B1 * | 1/2011 | Roth | G01N 21/3581 356/27 |
| 9,194,844 B2 * | 11/2015 | Koehler | G01N 29/11 |

(Continued)

*Primary Examiner* — Alvaro E Fortich
*Assistant Examiner* — Martin Walter Braunlich
(74) *Attorney, Agent, or Firm* — COATS & BENNETT, PLLC

(57) ABSTRACT

Non-destructive testing apparatuses, systems, and methods for assessing strain in structural components are disclosed. Structural components include induced predetermined regions having materials of varying density, including induced geometric patterns of differing densities within the structural component that can be a composite material structural component. The method includes projecting waves of energy, that can be beams of electromagnetic (EM) energy and/or waves of ultrasonic (UT) energy, into or through the structural component to evaluate the predetermined induced pattern region of varying density and determining existing strain within a structural component based on the detected energy response.

19 Claims, 14 Drawing Sheets

(56) References Cited

U.S. PATENT DOCUMENTS

| | | | |
|---|---|---|---|
| 10,337,918 B1* | 7/2019 | Kruspe | .................... G01L 1/16 |
| 10,648,937 B2* | 5/2020 | Baucke | ................. G01N 22/02 |
| 2018/0340858 A1* | 11/2018 | Jahanbin | ................ G01N 29/11 |
| 2019/0310076 A1 | 10/2019 | Georgeson et al. | |
| 2020/0292302 A1 | 9/2020 | Georgeson et al. | |

* cited by examiner

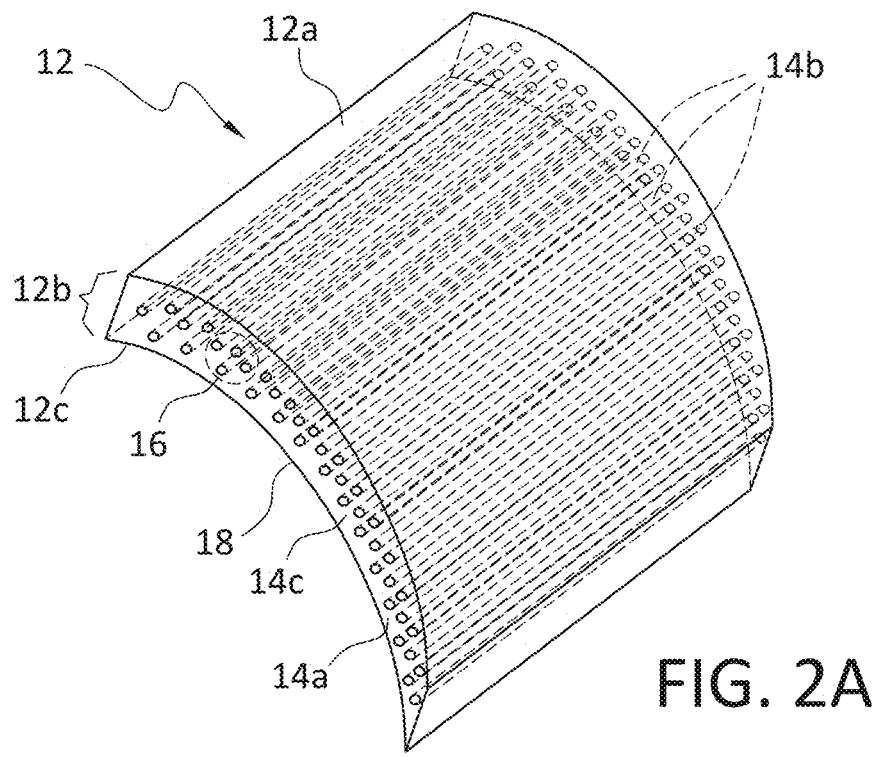
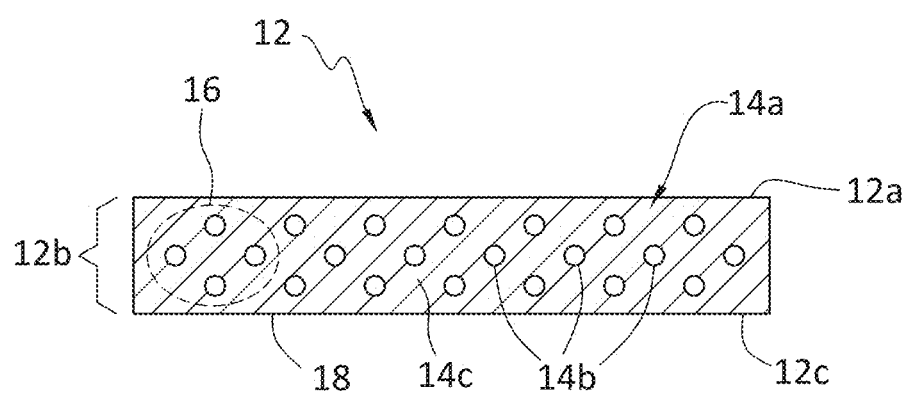
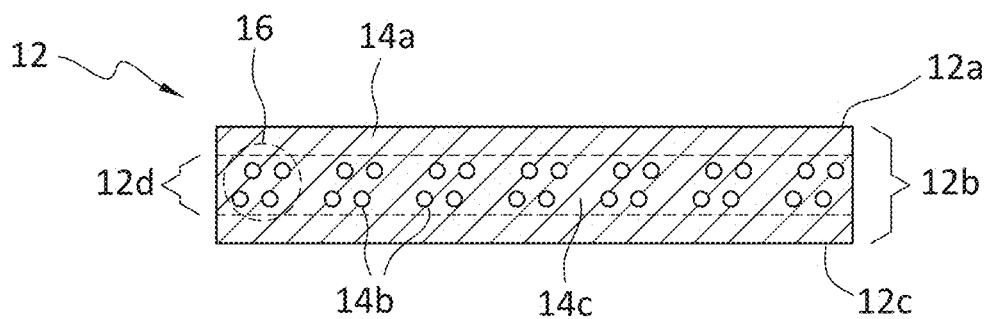

METHODS, SYSTEMS, AND APPARATUSES FOR NON-DESTRUCTIVELY INSPECTING, DETECTING, AND MEASURING STRUCTURAL COMPONENT INTERNAL DEFORMATION AND STRAIN BY CORRELATING DENSITY VARIATIONS OF INDUCED MATERIAL DENSITY PATTERNS

RELATED APPLICATIONS

This application claims priority to U.S. Provisional Patent Application Ser. No. 63/152,376 filed on Feb. 23, 2021, the entire contents of which are incorporated herein by reference.

TECHNOLOGICAL FIELD

The present disclosure relates generally to non-destructive inspection (NDI) of structural components. More specifically, the present disclosure relates to NDI systems and methods for detecting strain in structural components, including strain caused by exposure to environmental conditions.

BACKGROUND

Many mechanical systems, such as commercial vehicles, manufacturing equipment, and other industrial systems, may be exposed to particularly energetic environmental conditions, such as vibration, temperature extremes, impacts and mechanical stresses. For example, even when on the ground, structural components in aircraft may be exposed to significant stresses during cargo loading and unloading, as well as impacts from support vehicles and ground support equipment. During flight, stresses and/or impacts may result during take-off and landing, e.g., from shifting or improperly secured cargo, from impacts with objects during flight, etc. In addition, some structural components may experience thermal stresses when exposed to high temperatures. Some composite materials, for example, may be affected by thermal degradation, which may compromise the mechanical properties of the composite, including flexural strength, compression after impact, and inter-laminar shear strength, among others. It is therefore common for selected structural components of various industrial systems to be routinely inspected and evaluated during the operational lifetime of the structural component.

The integrity of one or more structural components may be compromised without an accompanying visually detectable indication of the effect of environmental conditions on the components. Evidence of sub-surface damage from, for example, internal strain, cannot be visually detected at the surface, and sub-surface damage often cannot be determined without destructive inspection techniques. Unless explicitly identified as such, no statement herein is admitted as prior art merely by its inclusion in the Technological Field and/or Background section.

SUMMARY

Present methods, systems, and apparatuses are directed to the improved non-destructive detection of the deformation and strain of a structural component occurring at a sub-surface regions of the structural component not visible during routine or scheduled inspections. Further aspects disclose inducing a pattern region into a sub-surface region of a structural component, with the pattern region having a predetermined density that varies from the density of adjoining sub-surface material in the structural component.

According to present aspects, inducing a predetermined pattern region having a predetermined density that varies from the density of adjoining material, strain and deformation occurring within the structural components can be accurately detected and assessed and quantified non-destructively by applying energy waves, including Terahertz energy waves and/or ultrasonic energy, and correlating the deflected waves from the induced sub-surface pattern region to known values to detect, assess, and quantify the existence or absence of incurred strain and deformation in the structural component.

A present aspect discloses a method for non-destructively assessing strain in a structural component, with the method including emitting an energy wave from an energy source at a first wavelength, delivering the energy wave from the energy source at the first wavelength to a structural component substrate sub-surface region of the structural component, with the structural component substrate sub-surface region comprising a structural component substrate first material comprising a first density, with the structural component substrate sub-surface region further comprising an induced pattern region, with the induced pattern region comprising a structural component substrate second material comprising a second density, and with the first density differing from said second density. The method further includes directing the energy wave from the induced pattern region in the form of a deflected energy wave to generate at least one of: a diffraction response, a refraction response, and a reflection response, detecting the deflected energy wave from the induced pattern region at a detector.

In another aspect the method further comprises, correlating at least one of: the diffraction response, the refraction response, and the reflection response from the induced pattern region to strain present in the structural component substrate sub-surface region.

In another aspect, the energy wave comprises at least one of: an electromagnetic energy beam and an ultrasonic energy wave.

In another aspect, the energy wave comprises a Terahertz energy beam.

In a further aspect, the induced pattern region further comprises a geometric pattern.

In another aspect, in the step of correlating the diffraction response from the induced pattern region, the method further includes accessing a reference induced pattern value, obtaining a detected induced pattern value, and comparing the reference induced pattern value to the detected induced pattern value.

In another aspect, the method includes obtaining a detected strain value for at least a portion of the structural component substrate sub-surface region.

In another aspect, the method includes, accessing a reference strain value for the structural component substrate sub-surface region, and correlating the detected strain value present with the reference strain value to determine strain present in at least a portion of the structural component substrate sub-surface region.

In another aspect, present methods include determining the presence or absence of strain existing in at least a portion of a structural component substrate sub-surface region.

In another aspect, present methods include determining when at least a portion of a predetermined structural component region requires rework to eliminate detected strain or other deformation occurring in at least the sub-surface region of the structural component.

In another aspect a method for fabricating a structural component, is disclosed, with the method including providing a structural component comprising a structural component substrate, said structural component substrate comprising a structural component substrate first material, with the structural component substrate first material having a first known density, and inducing a pattern region into the structural component substrate first material to form an induced pattern region, with the induced pattern region comprising a substrate component substrate second material having a second known density, and with the first density differing from said second known density. The method further includes forming a structural component substrate sub-surface region, wherein the structural component substrate sub-surface region comprises the induced pattern region, and wherein said induced pattern region is additively manufactured into the substrate material. The first known density can be greater than or less than the second known density.

In another aspect, the structural component substrate first material comprises at least one of a metal, a composite material, and combinations thereof.

In a further aspect, the structural component substrate is a multi-layer structural component substrate.

In another aspect, the multi-layer structural component substrate includes a cured adhesive material, with the cured adhesive material comprising a bond line region, and with the bond line region including the induced pattern region.

In another aspect, the cured adhesive material can include a resin-containing material.

In another aspect, the cured adhesive material can include an epoxy resin-containing material.

A further aspect discloses a structural component made according to the disclosed methods, and objects such as vehicles that include the structural component made according to disclosed methods, with the disclosed vehicles including at least one of: a crewed spacecraft; an uncrewed spacecraft; a crewed aircraft; an uncrewed aircraft; a crewed rotorcraft; an uncrewed rotorcraft; a crewed terrestrial vehicle; an uncrewed terrestrial vehicle; a crewed surface water borne vehicle; and uncrewed surface water borne vehicle; a crewed sub-surface water borne vehicle; and uncrewed sub-surface water borne vehicle; a hovercraft; a satellite; and combinations thereof.

In an further aspect, a method for non-destructively inspecting a structural component is disclosed, with the method including emitting an energy wave from an energy source at a first wavelength, delivering the energy wave from the energy source at the first wavelength to a structural component substrate sub-surface region of a structural component, with the structural component substrate sub-surface region comprising a structural component substrate first material comprising a first density, with the structural component substrate sub-surface region further comprising an induced pattern region, with the induced pattern region comprising a structural component substrate second material comprising a second density, and with the first density differing from said second density. The method further includes directing the energy from the induced pattern region in the form of a deflected energy wave to generate at least one of: a diffraction response, a refraction response, and a reflection response, and detecting the deflected energy from the induced pattern region at a detector.

In another aspect, a non-destructive inspection system for detecting deformation in a structural component is disclosed, with the system including an energy source configured to emit a first energy wave at an emitted energy wave first wavelength, with the energy source further configured to deliver the first energy wave emitted at the emitted energy wave first wavelength to a structural component, with the structural component including a structural component substrate first material comprising a first density. The structural component material further includes a structural component substrate sub-surface region, with the structural component substrate sub-surface region comprising an induced pattern region, with the induced pattern region comprising a structural component substrate second material comprising a second density, with the first density differing from the second density. The induced pattern region can be a selected geometric pattern region. The system further includes a detector configured to receive an energy wave from and in response to the structural component substrate sub-surface region in the form of a deflected energy wave to generate at least one of: a diffraction response, a refraction response, and a reflection response. The system can further include a processor in communication with the detector, with the processor configured to receive a signal from the detector, and with the processor further configured to compare the deflected energy wave with at least one of: the emitted energy wave first wavelength, a reference diffraction response, a reference refraction response, and a reference reflection response.

In a further aspect, in the presently disclosed non-destructive inspection systems, the processor is further configured to correlate the deflected energy wave to strain present in the structural component, including in the structural component substrate sub-surface region, with the sub-surface region including the induced pattern region.

In another aspect, the induced pattern region comprises a selected geometric pattern.

In a further aspect, the energy wave comprises at least one of a Terahertz energy beam and an ultrasonic energy wave.

According to further aspects, the disclosed systems are further configured to detect deformation in the structural component.

In another aspect, the detector is configured to read a sub-surface structural material density profile.

In another aspect, the structural component includes at least one of a metal and a composite material.

In a further aspect, the components of presently disclosed non-destructive inspection systems can include the energy source located on a first side of the structural component under investigation, with the detector located on the second side of the structural component under evaluation.

In another aspect, the components of the presently disclosed non-destructive inspection systems, including the energy source and the detector, can be located on the same side of the structural component under investigation (e.g., both of the energy source and the detector located on the first side of the structural component or both of the energy source and the detector located on the second side of the structural component).

In another aspect, a structural component is disclosed that includes a structural component substrate, with the structural component substrate including a structural component substrate first material having a first density, with the structural component substrate further including a structural component substrate sub-surface region that includes an induced pattern region, with the induced pattern region comprising a structural component substrate second material having a second density, and wherein said first density is different from the second density.

In another aspect, the induced pattern region in the induced pattern region comprises a geometric pattern.

In a further aspect, the structural component comprises at least one of: a metal and a composite material.

In another aspect, the structural component includes a multi-layer structure.

In a further aspect, the structural component further comprises a cured adhesive layer, said cured adhesive layer comprising a bond line region.

In another aspect, the cured adhesive layer includes a cured resin-based adhesive that can be a cured epoxy resin-based adhesive.

In a further aspect, the cured adhesive layer includes the induced pattern region, and the induced pattern region can be located at or near the bond line region.

In another aspect, the disclosed structural component can be integrated into an object that can be a vehicle.

In another aspect, the disclosed structural component can be incorporated into an aircraft.

In a further aspect, the vehicle can be at least one of: a crewed spacecraft; an uncrewed spacecraft; a crewed aircraft; an uncrewed aircraft; a crewed rotorcraft; an uncrewed rotorcraft; a crewed terrestrial vehicle; an uncrewed terrestrial vehicle; a crewed surface water borne vehicle; and uncrewed surface water borne vehicle; a crewed sub-surface water borne vehicle; and uncrewed sub-surface water borne vehicle; a hovercraft; a satellite; and combinations thereof.

The features, functions and advantages that have been discussed can be achieved independently in various aspects or may be combined in yet other aspects, further details of which can be seen with reference to the following description and the drawings.

BRIEF DESCRIPTION OF THE DRAWINGS

Figure 1:
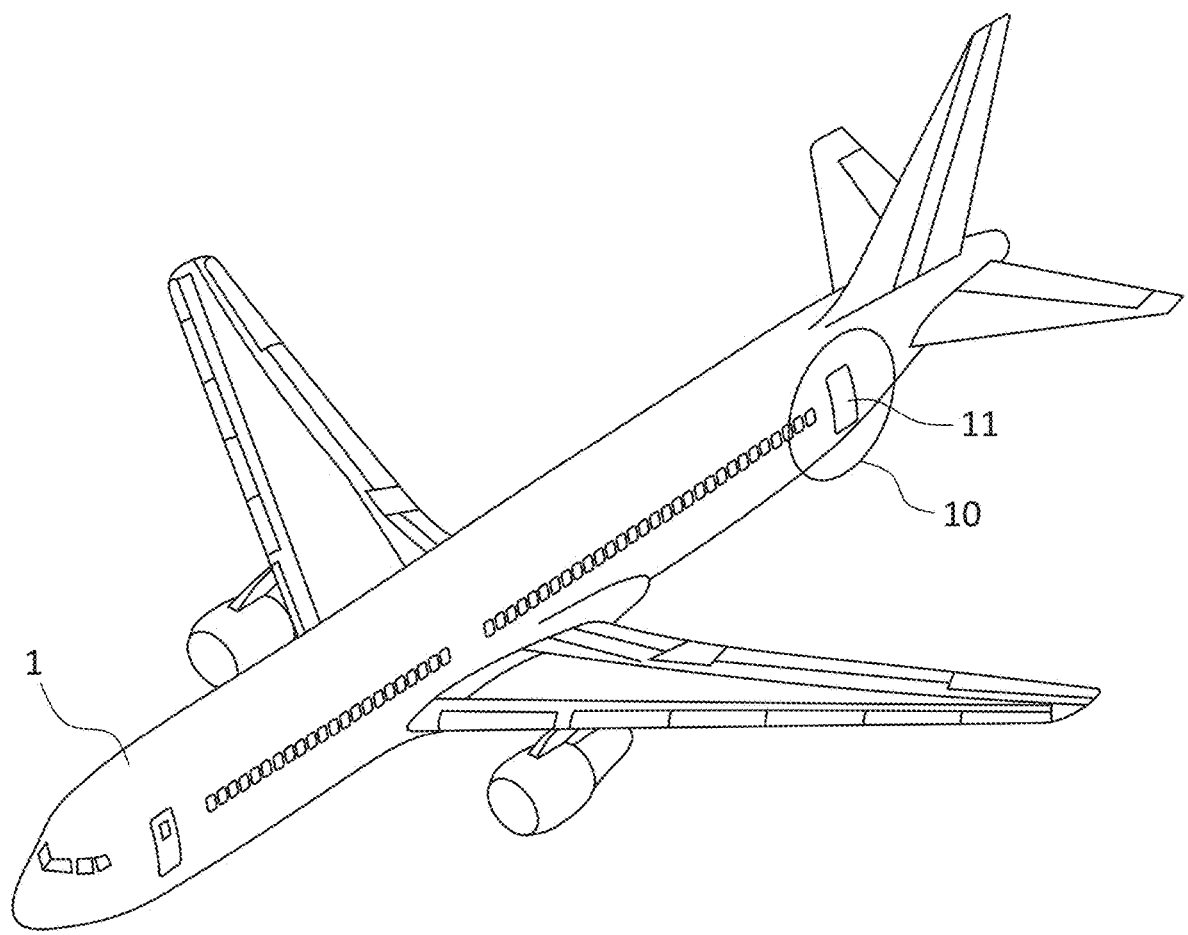
Figure 3A:
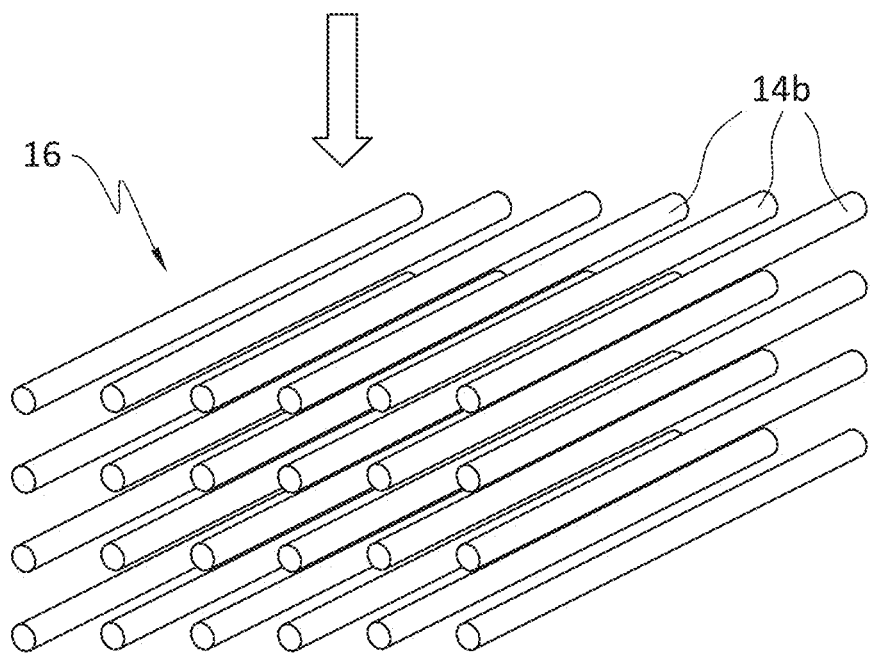
Figure 3B:
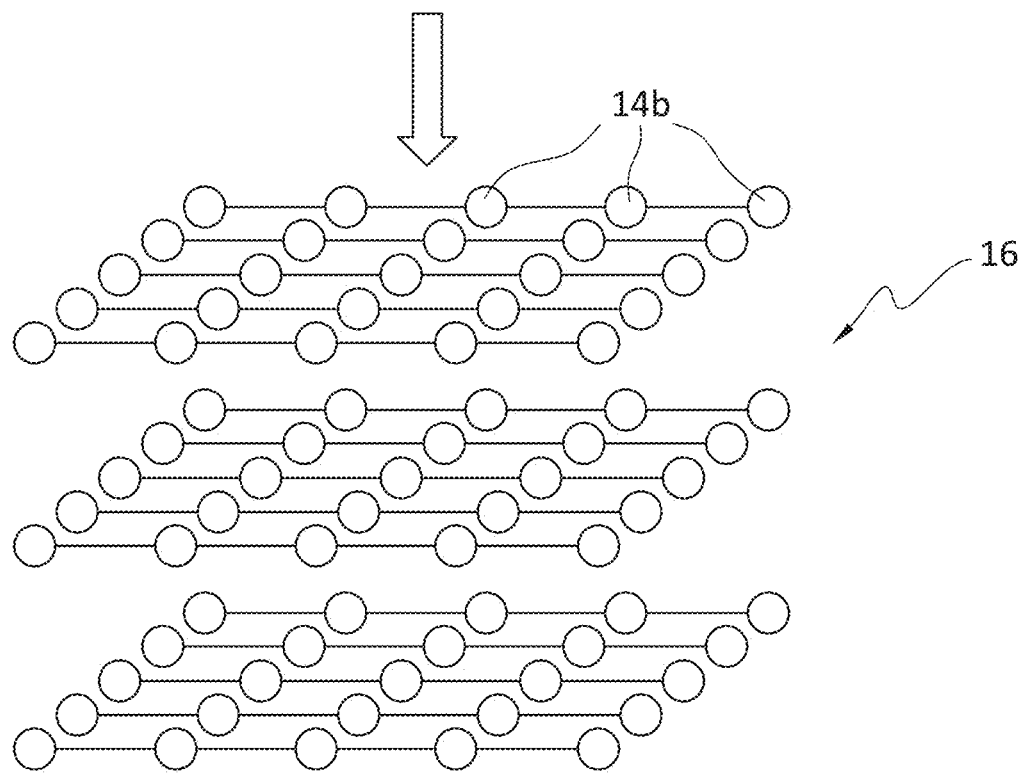
Figure 5:
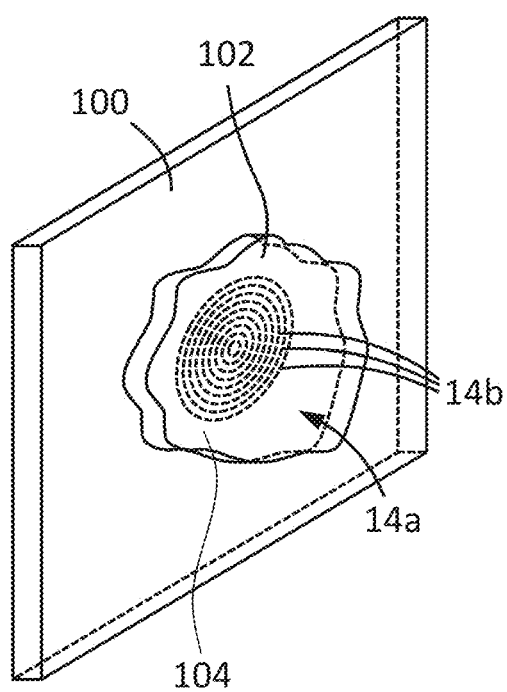
Figure 6:
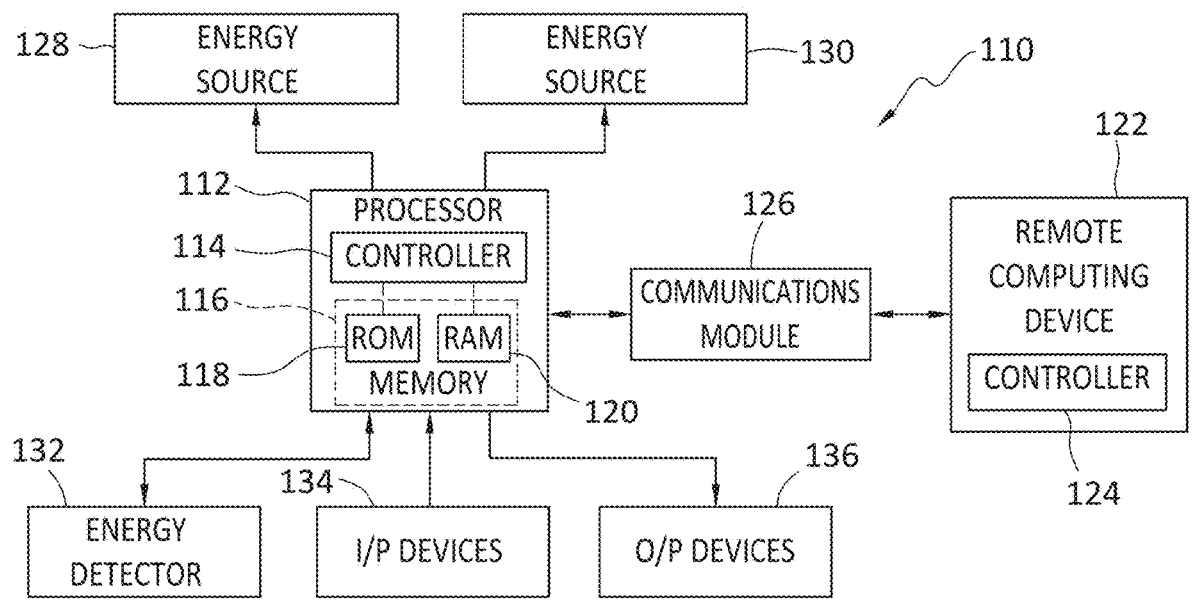
Figure 7:
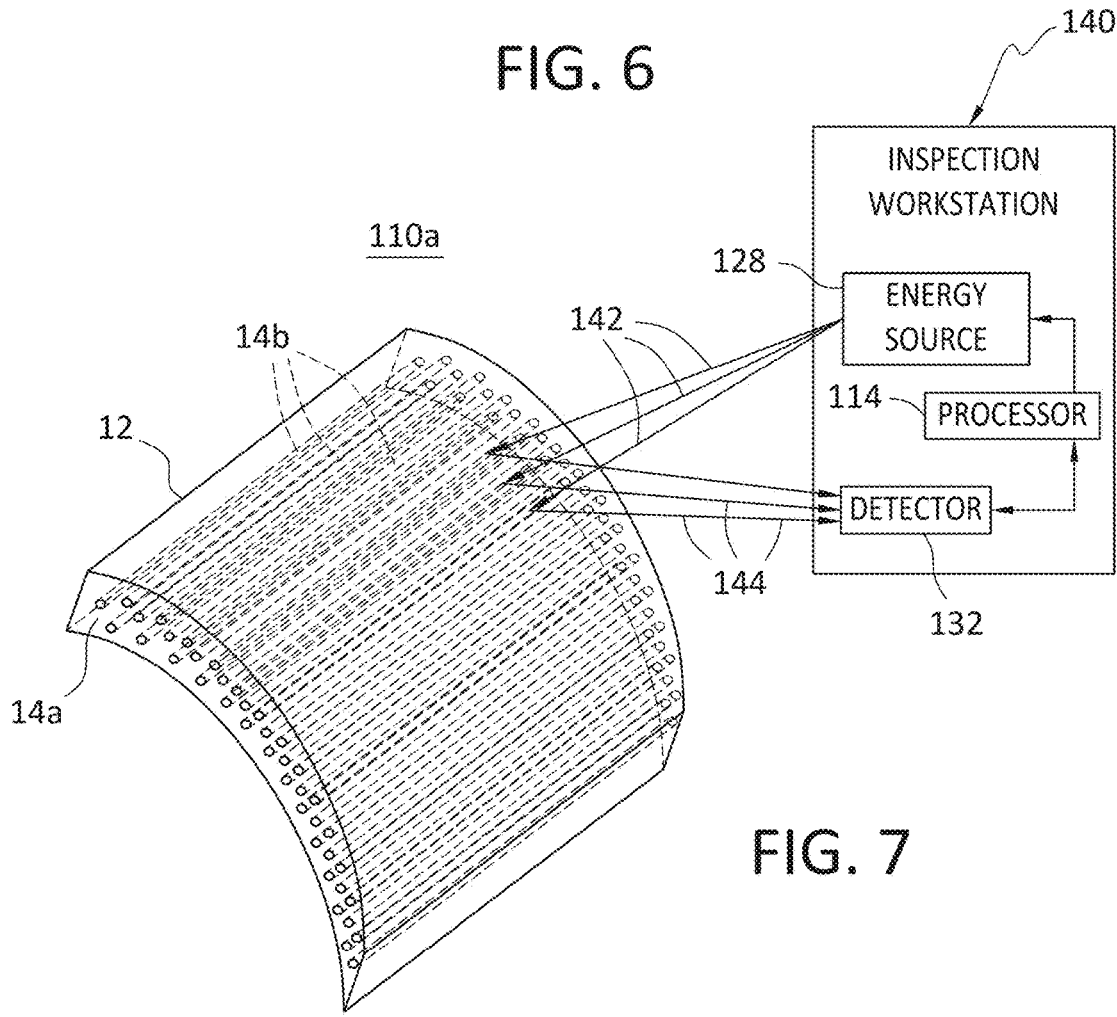
Figure 8:
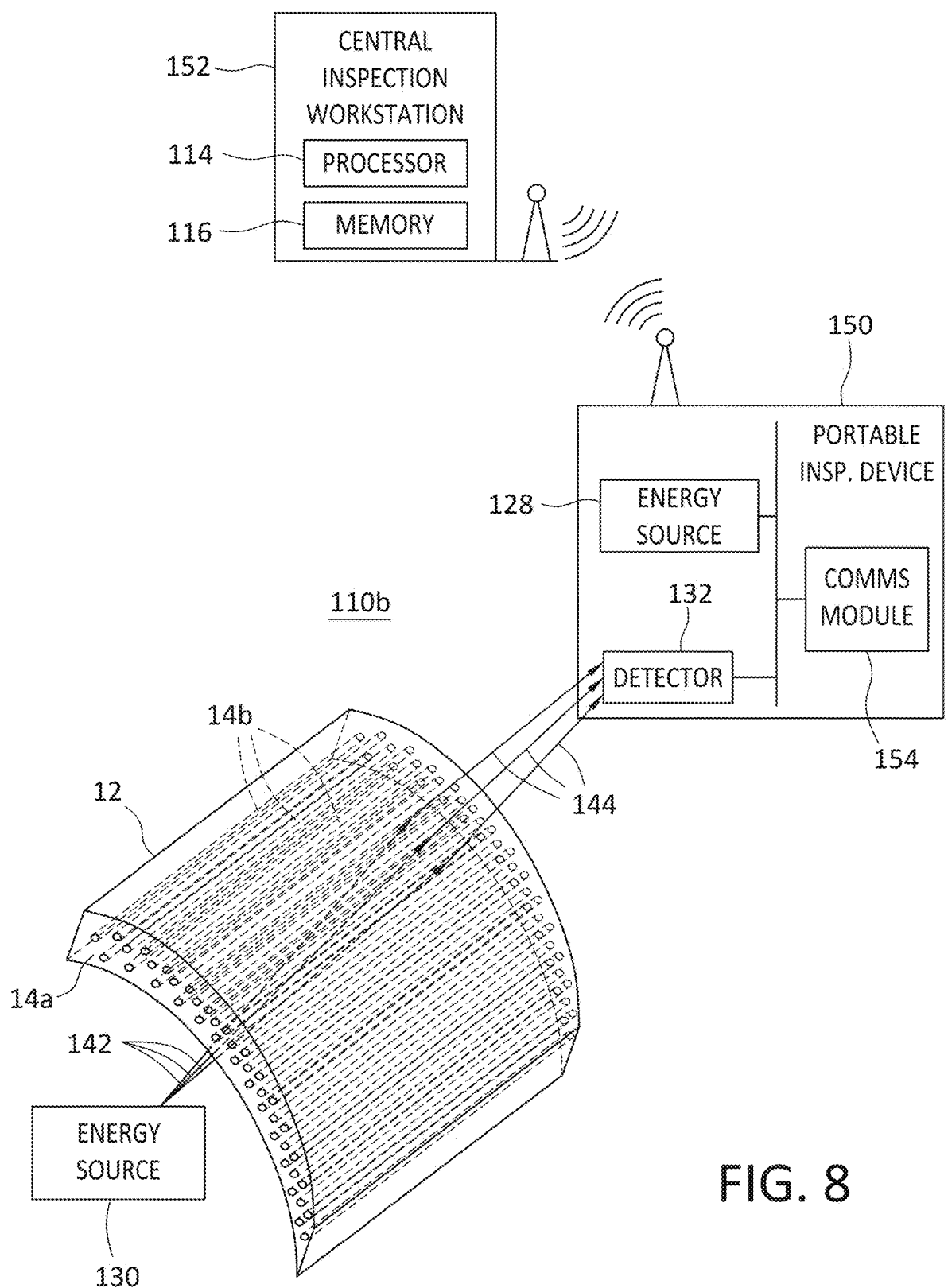
Figure 9:
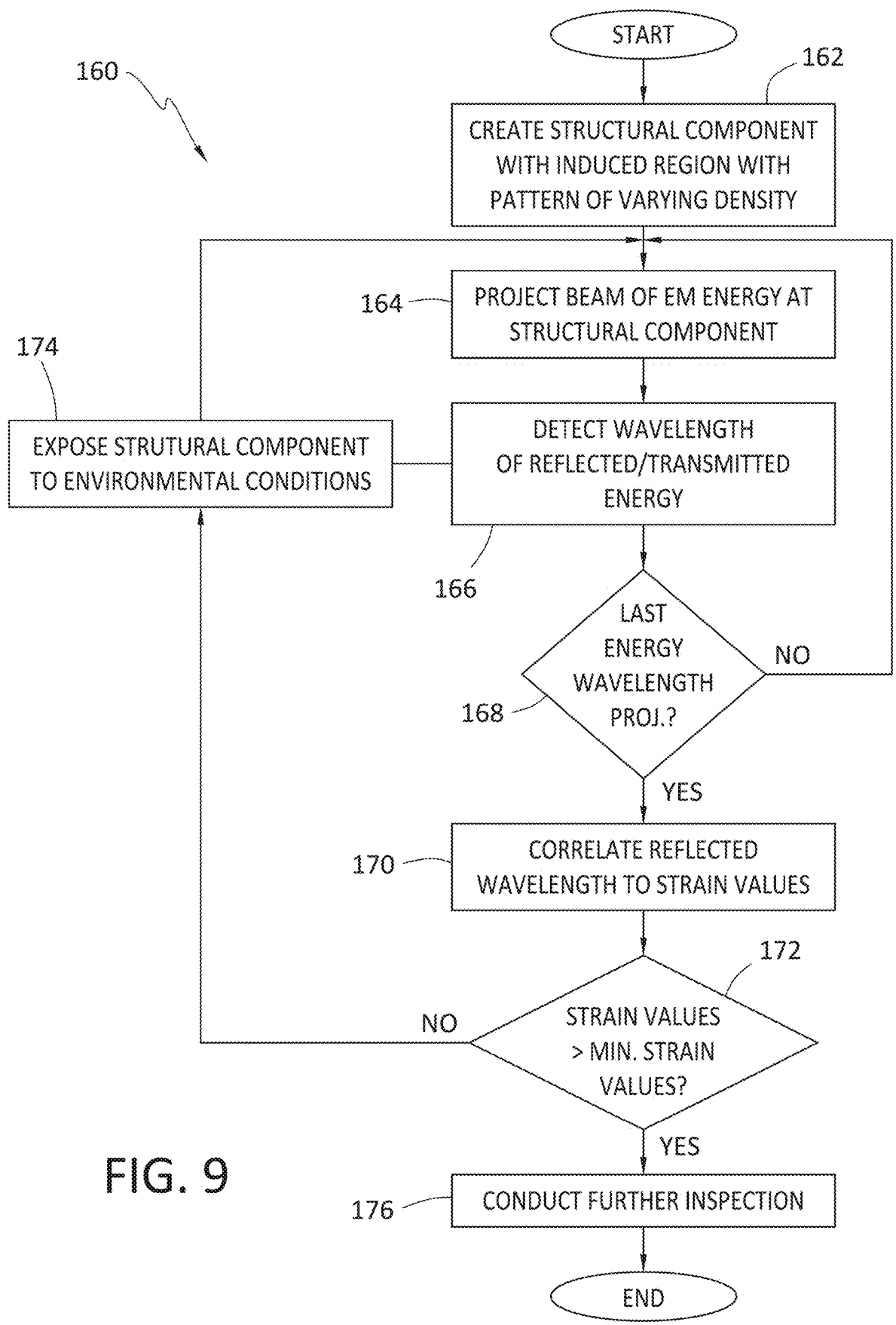
Figure 10:
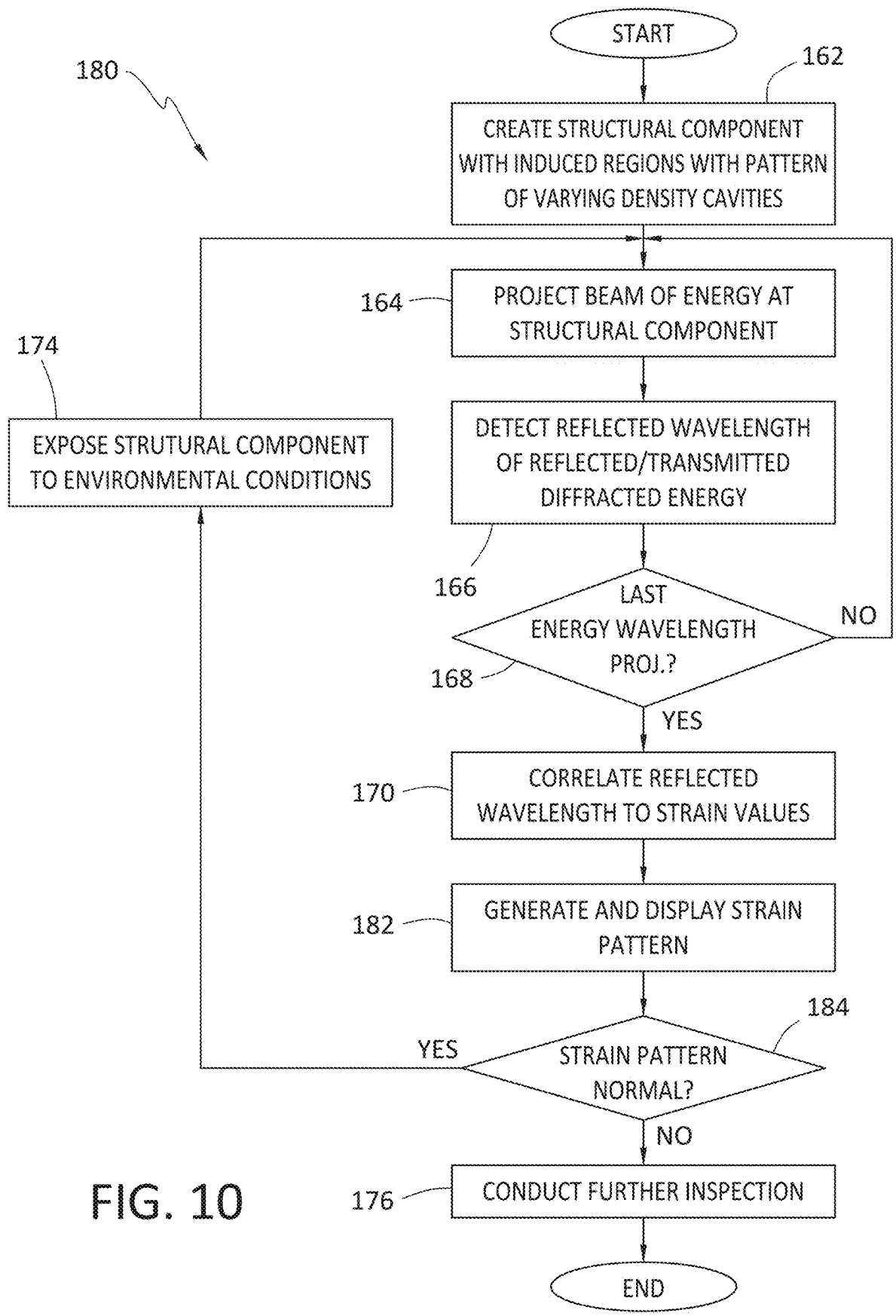
Figure 11:
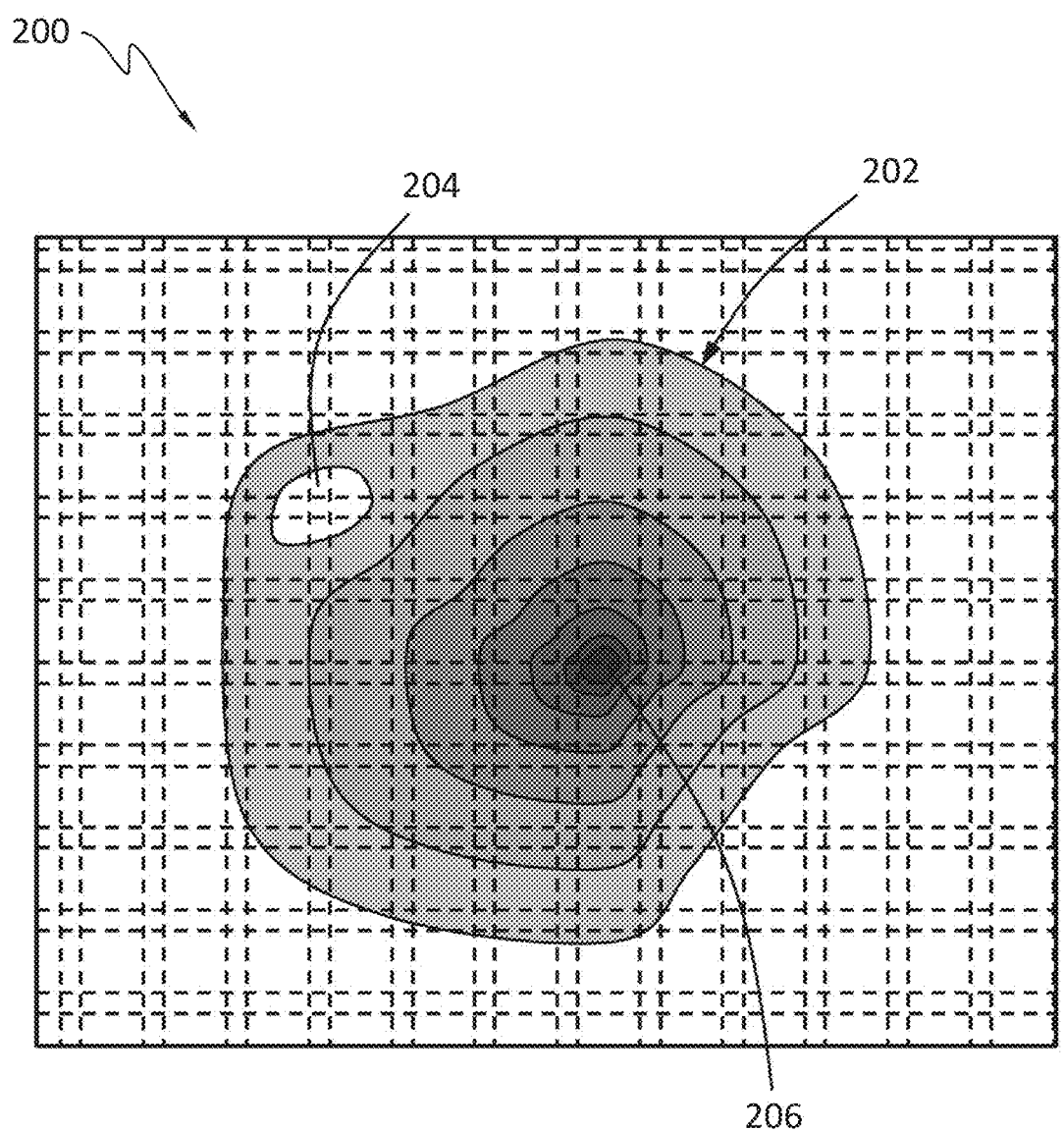
Figure 12:
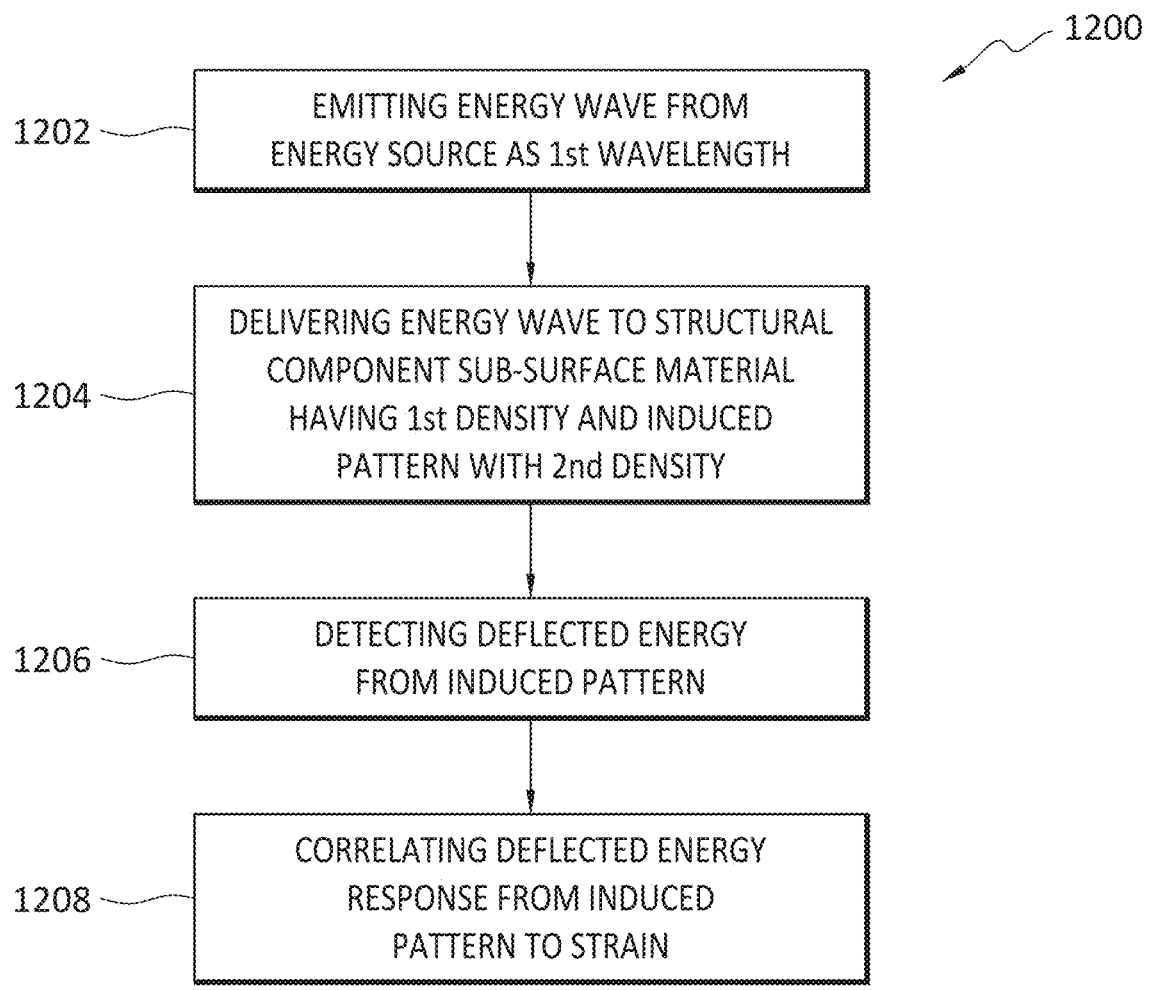
Figure 13:
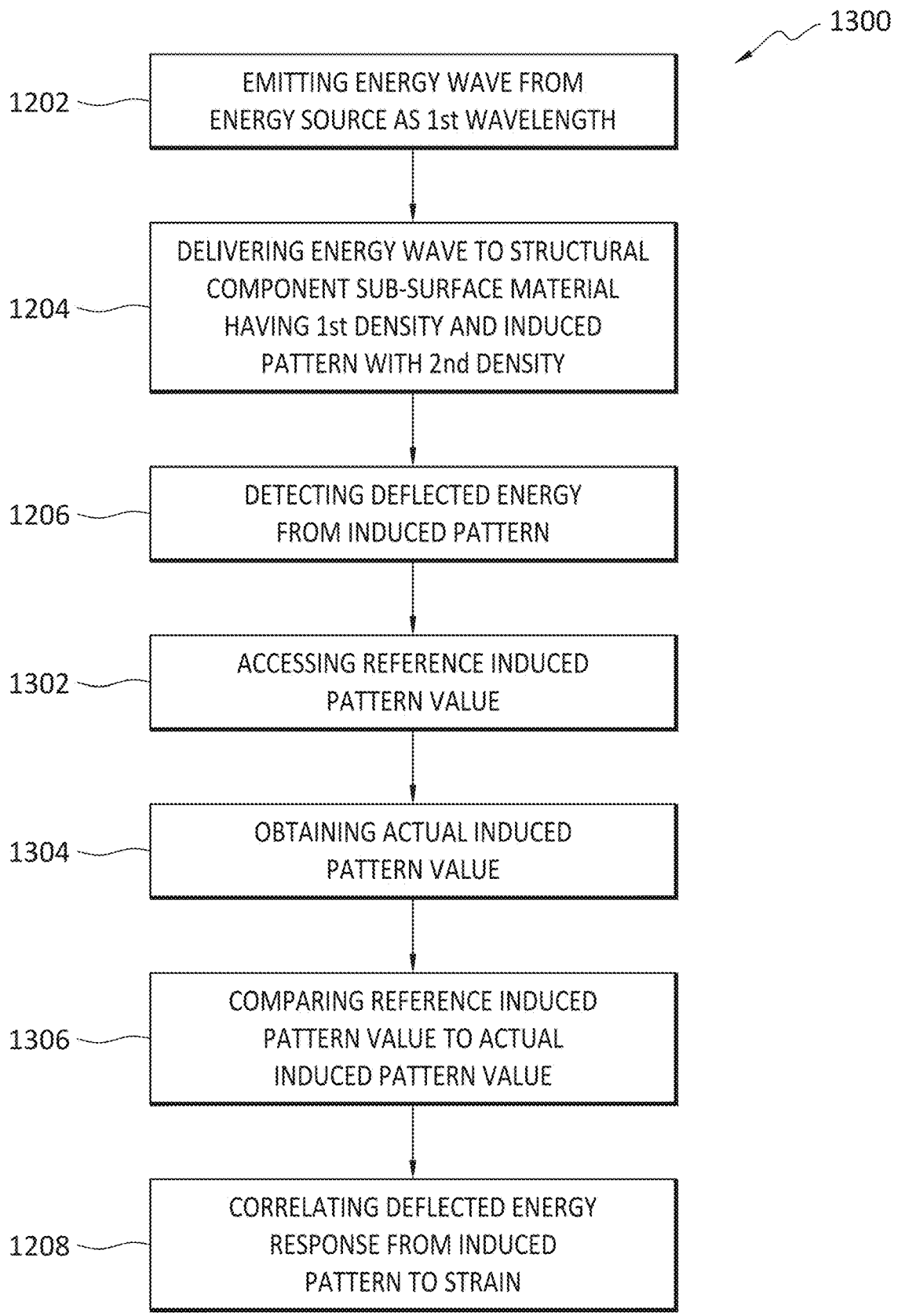
Figure 14:
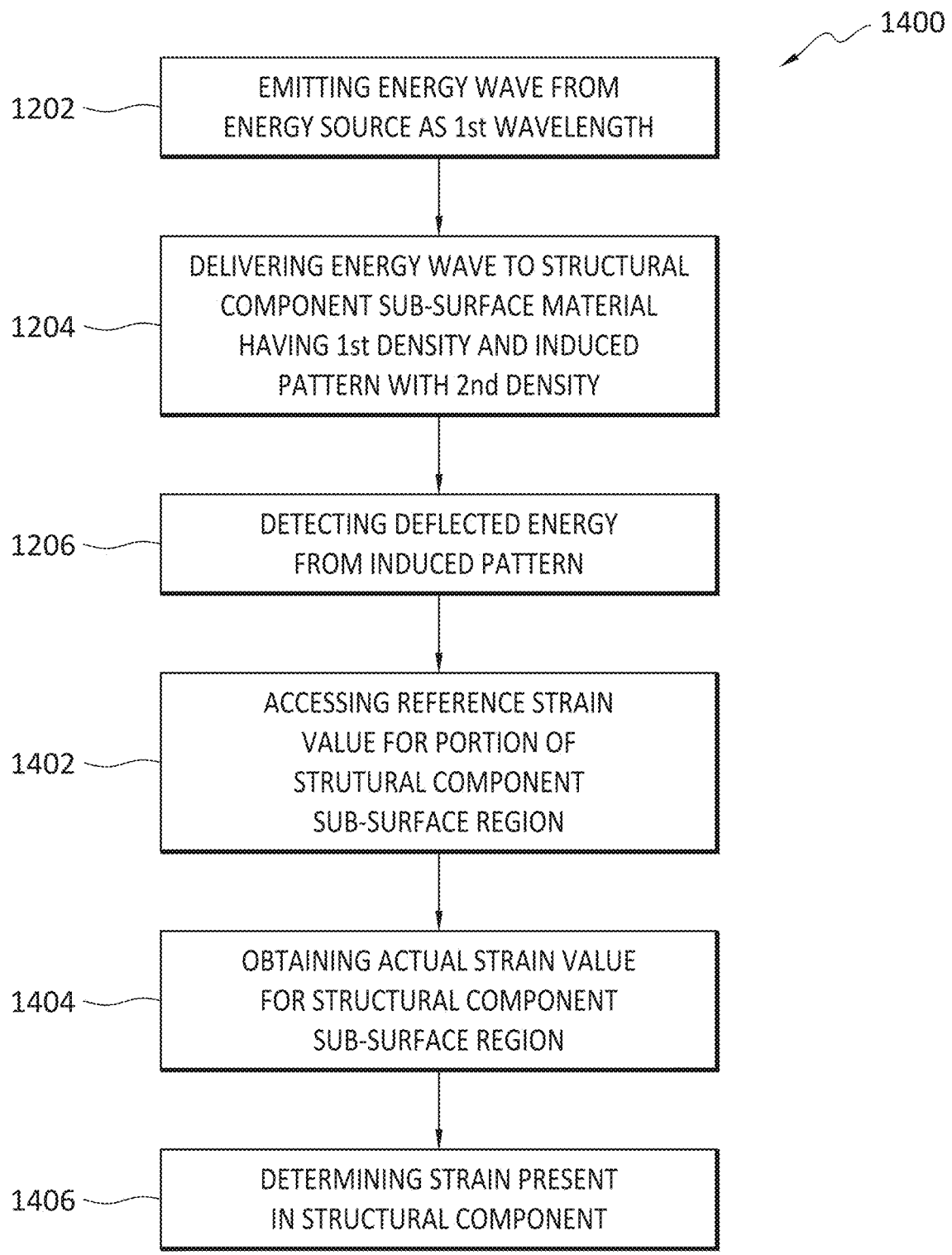
Figure 15:
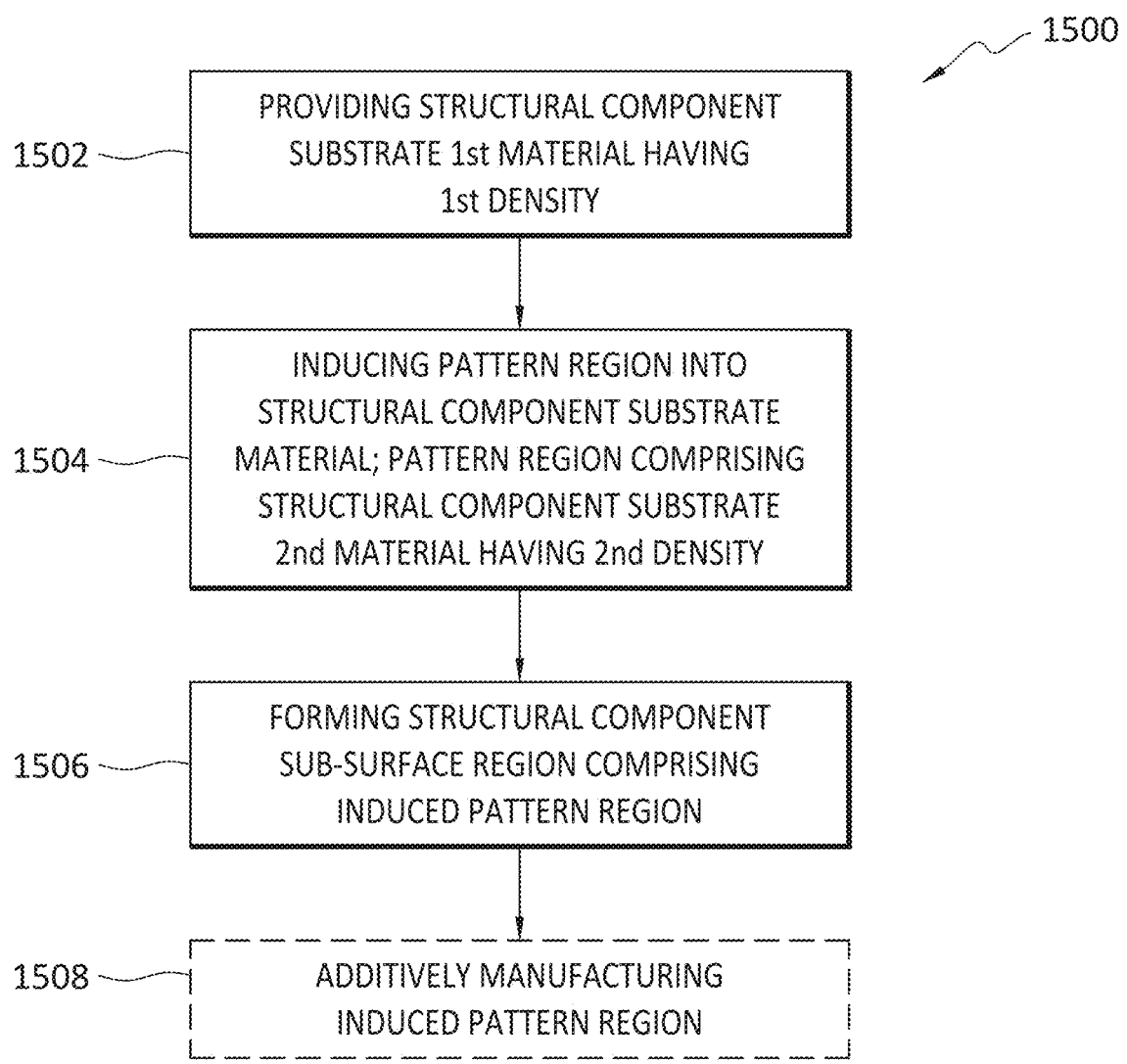

Having thus described variations of the disclosure in general terms, reference will now be made to the accompanying drawings, which are not necessarily drawn to scale, and wherein:

FIG. 1 is an illustration of an object comprising a structural component according to present aspects, with the object as shown in the form of a vehicle, and more particularly shown as an aircraft;

FIG. 2A is a perspective view of a structural component according to present aspects;

FIG. 2B is a cross sectional view showing the sub-surface of a structural component having an induced pattern region comprising material having a density that differs from the density of the surrounding material, according to present aspects;

FIG. 2C is a cross sectional view showing the sub-surface of a structural component having an induced pattern region comprising material having a density that differs from the density of the surrounding material, according to present aspects;

FIG. 3A is a perspective view of a pattern of material having a density that varies from the density of the surrounding structural material (and of the type shown, for example, in FIGS. 2, 2A, 2B, and 3B) and having a longitudinal orientation that can be introduced into the structural material during structural component build up (e.g., to form an induced pattern) during the fabrication of the presently disclosed structural components, according to present aspects;

FIG. 3B is a longitudinal end view of the induced material (having a second density) to be added to a surrounding structural material having a first density, with the first and second densities differing, according to present aspects;

FIGS. 4A, 4B, 4C, 4D, 4E, 4F, and 4G are plan views of induced pattern regions having various non-limiting geometric orientations, according to present aspects;

FIG. 5 is an isometric view of a portion of a structural component showing an exposed sub-surface region of the structural component revealing and comprising an induced pattern region, according to present aspects;

FIG. 6 is a block diagram of electrical and control components that can implement the structural component inspection system; according to present aspects;

FIG. 7 is a schematic illustration of an exemplary implementation of a non-destructive inspection system, according to present aspects;

FIG. 8 is a schematic illustration of an alternate exemplary implementation of the non-destructive inspection system, according to present aspects;

FIG. 9 is a flow diagram outlining a non-destructive inspection method, according to present aspects;

FIG. 10 is a flow diagram outlining a non-destructive inspection method, according to present aspects;

FIG. 11 is a diagram of an exemplary strain pattern display obtained by the presently disclosed methods, systems and apparatuses, according to present aspects;

FIG. 12 is a flow diagram outlining a non-destructive method for determining strain in a structural component, according to present aspects;

FIG. 13 is a flow diagram outlining a non-destructive inspection method for determining strain in a structural component, according to present aspects;

FIG. 14 is a flow diagram outlining a non-destructive inspection method for determining strain in a structural component, according to present aspects; and FIG. 15 is a flow diagram outlining a method for making a structural component, according to present aspects.

DETAILED DESCRIPTION

There exists a need for non-destructive inspection techniques that can indicate cumulative deformation effects including, for example, strain, on structural components after being exposed to environmental conditions during use such as, for example, repetitive loading, impacts, high temperatures, etc. Such indications can lead to the scheduling of further evaluation, maintenance, and/or replacement of the structural components at appropriate times.

According to present aspects, structural components can comprise a structural component substrate that can comprise a composite material that can be a multi-layer composite material, and that further comprises an induced pattern region located within a sub-surface region of the structural component substrate. According to further aspects, a structural component can be predominantly or substantially exclusively made from a composite material that can be a coated composite material, and that can include a metal outer or inner surface. In another aspect, presently disclosed structural components can comprise a composite substrate material that is bonded to a non-composite material including, for example, a metal such as, for example, aluminum, aluminum alloy, titanium, titanium alloy, etc. When presently disclosed structural components comprise a multi-layer structure with component layers bonded together, the layers can be bonded together with, for example, an adhesive material, with at least one of the composite material and the adhesive material layer comprising an induced pattern region. According to present aspects, the term "composite" and "composite material" refers to a material that includes a polymer-containing material, including a polymer-containing material that can include a resin-based material.

Present aspects are directed to methods, systems, and apparatuses for non-destructively determining the presence of strain in structural components. According to present methods and systems, structural components are provided with induced patterns of materials having varying density from surrounding structural component substrate materials. In addition, the introduction of materials having a varied and known density difference from surrounding materials are disposed in precise spatial distribution, for example, in the form of precise geometric orientation or geometric ordering. When energy at selected wavelengths and frequencies is directed at the structural component substrate, and when a strain (e.g., structural strain) is present in the structural component substrate, the energy wavelengths impact the induced pattern regions (e.g., the patterned regions that are induced into a structural component substrate sub-surface region and that are not visible from an outer or inner surface of the structure component) that comprise materials of varying density and that are arranged in precise and unique selected geometries and geometric orientation, such that the energy wavelengths are altered or otherwise deflected, causing a refractive response that is detected, measured, and that can be correlated to non-destructively determine the presence and amount of strain existing in the structural component, as well as detecting and confirming the absence of strain.

According to present aspects, the density difference in the selected structural component substrate sub-surface materials (located in sub-surface regions) that is introduced into the induced pattern and induced pattern regions, in concert with the selected geometries of the induced patterns and induced pattern regions, establish very specific and precise internal diffractive, refractive, or reflective energy frequency responses. One or more energy source types can be selected and used depending on the characteristics of the structural component being interrogated, and the implemented energy sources (as well as the selected frequencies and selected wavelengths of the selected energy sources) can further be selected in consideration of the location of the region being interrogated within a structural component substrate sub-surface region, as well as the required quality, fidelity and mapping capability that is desired.

According to present aspects, energy sources to be implemented can include electromagnetic energy sources having frequencies along the electromagnetic spectrum and ranging from below one hertz to above $10^{25}$ hertz, and including near-, mid-, and far-infrared radiation, microwave radiation, and terahertz radiation.

The terahertz (THz) frequency range refers to electromagnetic waves with frequencies between about 100 GHz and about 10 THz, or wavelengths between about 3 mm and about 30 μm, existing in the radiation spectrum between the microwave and infrared regions. The present disclosure uses the terms "THz radiation", "THz energy", and "THz waves" equivalently and interchangeably. According to present aspects, terahertz waves pass through a variety of amorphous and opaque materials with high chemical selectivity, with the ability to image such material under THz interrogation with high definition. As is disclosed herein, non-destructive THz inspection techniques for interrogating materials including dielectric (e.g., non-conducting) materials can include the inspection of a structural component comprising composite materials.

In addition to electromagnetic energy, present aspects contemplate incorporating the use of ultrasound or ultrasonic energy as an energy source, with ultrasound energy emitted from an ultrasound source in energy waves having a frequency that can be greater than about 20,000 Hz. As used herein, the terms "ultrasound energy", "ultrasonic energy" and "ultrasound waves" are equivalent terms used equivalently and interchangeably. Ultrasound energy causes particles in target substrates to vibrate and propagate the ultrasound energy. According to present aspects, the ultrasound energy generally travels through most mediums in the form of a wave. Types of waves include shear, surface, and longitudinal waves. While ultrasound waves penetrate into and through a target substrate, including, for example, the presently disclosed structural components, the amplitude of the ultrasound wave can be continually reduced or weakened due to, for example, the distance it travels, and due to the scattering or deflecting of energy signals as the wave propagates and further due to the conversion of some of the energy to heat energy within the target substrate.

According to present aspects, when using electromagnetic energy (e.g., Terahertz wavelengths) and/or ultrasound energy, responses from a target substrate result in the form of signals that can be detected, collected, and measured. These measurements are also conducted using a range of appropriate frequencies to enable higher quality and fidelity of signals deflected to sensors from the target substrate, and result in refined maps of the local strain, stress, and/or damage condition throughout the part. The density variations can be higher or lower densities as compared to the bulk of the structural component.

According to present aspects, various geometries and patterns can be generated into regions of the structural component substrate, including sub-surface regions, to form induced pattern regions using additive manufacturing and other precision fabrication methods. Geometries can include, but are not limited to, spherical, linear, fiber-like, tube, disks, and/or flakes. Further, geometric orientation, or ordering, of a substrate material can further contribute to geometric patterning in an induced pattern region of a substrate under investigation.

Structural components that sustain internal strain through use include structural components (equivalently referred to herein as "structures") can be used in objects such as vehicles, including at least one of: a crewed spacecraft; an uncrewed spacecraft; a crewed aircraft; an uncrewed aircraft; a crewed rotorcraft; an uncrewed rotorcraft; a crewed terrestrial vehicle; an uncrewed terrestrial vehicle; a crewed surface water borne vehicle; and uncrewed surface water borne vehicle; a crewed sub-surface water borne vehicle; and uncrewed sub-surface water borne vehicle; a hovercraft; a satellite; and combinations thereof.

FIG. 1 is an illustration of a representative object, in the form of a particular vehicle, and more particularly in the form of an aircraft. As shown in FIG. 1, aircraft 1, comprises a structural component in the form of a cargo door 11 with the circle shown in FIG. 1 broadly encompassing a cargo door region 10 that houses the cargo door 11.

According to present aspects, the structural component and structural component substrate can be non-destructively examined, interrogated, inspected, etc., according to present methods without disassembling or damaging the structural component or structural component substrate. FIG. 2A is an exposed perspective view illustrating a structural component used in a vehicle (e.g., aircraft) assembly in the form of a structural component substrate 12 of the cargo door 11 (e.g., a structural component as shown in FIG. 1). As shown in FIG. 2A, the structural component substrate 12 includes a structural component substrate first material 14a that can further include a composite material (e.g., a resin-containing composite material such as, for example, an epoxy resin-containing composite material, etc.) and that can occur at a sub-surface region of structural component substrate 12. The structural component substrate 12 can be a multi-layer structural component that can include multiple layers of composite material, and/or the structural component substrate 12 can be a multi-layer structural component substrate that can include one or more metal layers (e.g., aluminum, titanium, etc.), with metal layers that can be, for example adhered or otherwise joined to the composite material (e.g., via one or more layers of adhesive material, etc.). The metal layers can serve as outer layer of a structural component first side (e.g., an outer side or exterior of a component) and/or as an outer layer of a structural component second side second of the structural component (e.g., an outer side of an interior of the structural component).

For example, as shown in FIG. 2A, the structural component substrate 12 can include a structural component first side 12a (referred to equivalently herein as a "structural component outer surface", and the first side also can be a coating that can be, for example a paint coating, primer, or finished livery, etc.) and a structural component second side 12c (referred to equivalently herein as a "structural component inner surface" and the second side can be a coating that can be, for example a paint coating, primer, etc.), with one or more of the structural component first side 12a and structural component second side 12c being a metal layer and/or a composite material layer.

As shown in FIG. 2A, structural component substrate 12 includes a structural component substrate sub-surface region 12b, with the structural component substrate sub-surface region 12b comprising a structural component substrate first material 14a, with the structural component substrate first material 14a having a first density (equivalently referred to herein as a "first density value"), and a structural component substrate sub-surface region 12b comprising a structural component substrate second material 14b, with the structural component substrate second material 14b having a second density (equivalently referred to herein as a "second density value").

According to present aspects, induced patterns (referred to equivalently herein as "induced groupings") of the structural component substrate second material 14b as shown at least in FIGS. 2A, 2B, 3A, 3B are arranged spatially and precisely, (e.g., with selected precision), within the structural component substrate first material 14a and the induced patterns are created, deposited, induced or otherwise configured to form an induced pattern region 14c comprising the induced pattern of the structural component substrate second material 14b. According to present aspects, the induced pattern region 14c evaluated as a defined region itself can also have a density that is different from the surrounding material density (e.g., the first density of the structural component substrate first material 14a that surrounds the induced pattern region(s).

Though not shown explicitly in the FIGS., one or more of the structural component first (e.g., outer) layer 12a and the structural component second (e.g., inner) layer 12c can further comprise additional layers including, for example, primer layers, coating layers, etc.

FIGS. 2B and 2C are cross-sectional views of a section of the structural component substrate 12 of the type shown in FIG. 2A. As shown in FIGS. 2B and 2C, the structural component substrate second material 14b is intentionally arranged (e.g., arranged spatially, spatially induced, etc.) within and amidst the structural component substrate first material 14a and is otherwise configured to form the induced pattern 16 in the induced pattern region 14c, with one such region represented by the region bounded by the broken circular line 16 in the structural component substrate sub-surface region 12b. In FIG. 2C, the induced pattern is shown in groupings of four segments of longitudinally-oriented structural component substrate sub-surface second material 14b that are introduced in a selected location and in a selected order or orientation (e.g., positioning or orientation with respect to each other) within the structural component substrate first material 14a to form the induced pattern 16 represented shown bounded by the broken circular line in the induced pattern region 14c of the structural component substrate sub-surface region 12b. In addition, a structural component may include a bond line that, for example, after curing, may be better defined as a bond line region. FIG. 2C illustrates a bond line region 12d within structural component substrate 12 that can occur coincident within induced pattern region 14c.

According to present aspects, both the structural component substrate first and second materials 14a, 14b, respectively, can be composite materials (e.g., prepregs or other composite material precursors) that can be layered up, or that can otherwise be deposited such that layers and regions with the layers can be deposited (e.g., sequentially and with precision, etc.), via methods including, for example, additive manufacturing, printing methods (including, e.g., inkjet printing methods, etc.), direct write methods, etc., for the purpose of producing a hybrid material at least in a structural component substrate sub-surface region, such that amounts of the structural component substrate first and second materials 14a, 14b are deposited to occur at intentionally selected locations in the structural component substrate sub-surface region, for example, to form the induced patterns.

FIGS. 3A and 3B show further exemplary detail of the induced pattern 16 of longitudinally-oriented structural component substrate second material 14b that is introduced into a selected location and selected orientation within the structural component substrate first material 14a, and that is shown in FIGS. 2A, 2B, and 2C. FIG. 3A shows a perspective view of the longitudinally-oriented structural component substrate second material 14b. In the case of (at least) composite material deposition, etc., via e.g., additive manufacturing, linear features of additively manufactured regions of a component or component precursor (for example, a component or component precursor that can be incorporated into a structural component as a structural component substrate second material) can comprise the selected addition, inclusion, inducement, etc. of the structural component second material that is intentionally interspersed in and amidst the sub-surface structural component substrate first material (14a, as shown in FIGS. 2A, 2B, 2C). The structural component substrate second material 14b has a (second) density value that varies from the structural component substrate first material (first) density value. In other words, the structural component substrate second material 14b has a (second) density value that can be greater than or less than the structural component substrate first material (first) density value.

According to present aspects and methods, when incident energy having a selected wavelength or wavelength range (e.g., in the form of energy beams or energy waves, etc.) is directed into the presently disclosed structural component substrate sub-surface region, the density variation of materials and material regions and induced patterns (e.g., the induced patterns that can further include unique geometric patterns that are achieved by the incorporation of the structural component substrate second material into and amidst the structural component substrate first material) create non-destructively detectable deflection waves (e.g., in 3-D) in specified directions and at specified wavelengths, and in the form of diffraction waves (diffracted energy waves), reflection waves (reflected energy waves), and/or refraction waves (refracted energy waves). According to present aspects, the detectable deflected waves can be detected and correlated to internal strain that is determined to be present in (or absent from) at least the structural component substrate sub-surface regions; including evidence of strain, damage, deformation, delamination, etc., in the structural component regions (e.g., damage that would not be visibly detectable from a surface inspection of the structural component). The energy wave responses created and altered by the presence of the induced pattern of varying material densities (induced into the structural component material) are correlated as responses to internal strain in the structural component material and can represent a bulk material response as opposed to individual layers or can further facilitate a measurement of strain at an individual layer.

As shown in FIGS. 3A and 3B present aspects contemplate the delivery of an energy wave from a first side of a structural component, introduction of the energy waves to penetrate into and through the structural component in a direction that, as shown and indicated by "arrows", is substantially perpendicular to the longitudinal orientation of the sub-surface second material segments (shown in FIGS. 3A and 3B as longitudinally oriented cylindrical "rods"). According to this aspect, when energy waves are delivered to the structural component perpendicularly, and from energy sources located on a first side of the structural component, detectors, sensors, etc. can be located on the second side of the structural component (to receive the deflected waves that have penetrated into and passed through the structural material, for example, in the direction of the "arrow" shown in FIGS. 3A and 3B). In addition, present aspects also contemplate locating energy wave sources and detectors on the same side of the structural component (both the source and detector on either the first side or second side of the structural component) that can allow the angle of delivery of the energy wave to be other than substantially perpendicular (defined as approximately equal to 900 relative to the plane of the structural component surface). See, for example, FIGS. 7 and 8.

According to present aspects, "ordered" structural component substrate second material segments or elements (with the structural component second material segments or elements "ordered" or otherwise deposited and arranged within the structural component substrate first material into an induced pattern) can be additively manufactured, with density differences that are higher or lower than the density of the surrounding structural component substrate first material. The disparity between the two material densities, according to present aspect, creates diffraction or refraction of a delivered energy wave having a known wavelength.

The structural component substrate second material can be added in the form of induced patterns of a material having a differing density from the structural component substrate first material. The structural component substrate second material can further be arranged through precise deposition, incorporation, inducement, etc. into selected geometric patterns, such as the exemplary and non-exhaustive geometric patterns 20a-20g shown respectively in FIGS. 4A, 4B, 4C, 4D, 4E, 4F, and 4G.

Figure 4A:
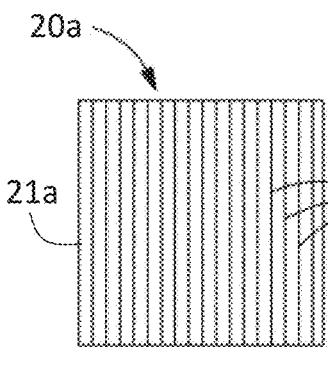

FIG. 4A shows an exemplary geometric pattern 20a formed into induced pattern 22a by introducing amounts of structural component substrate second material (into the structural component substrate first material 21a) configured as a series of parallel lines. Present aspects contemplate a linear pattern such as that shown as induced pattern 22a can be, for example, implemented into cylindrical structural components (e.g., a pipe, not shown) that can be subjected to circumferential stresses and strain, for example.

Figure 4B:
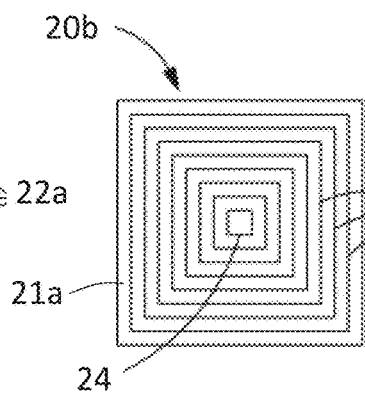
Figure 4C:
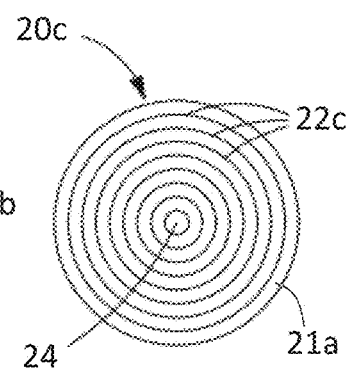
Figure 4D:
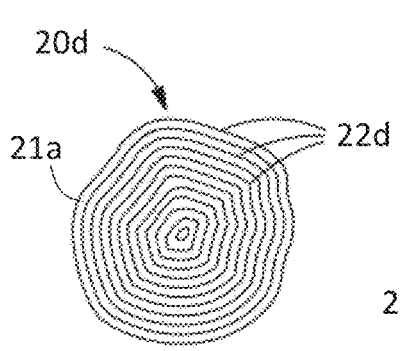
Figure 4E:
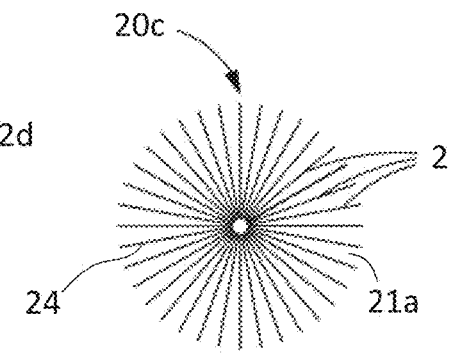
Figure 4F:
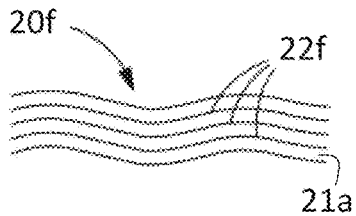

FIG. 4B illustrates an exemplary geometric pattern 20b formed into induced pattern 22b by introducing amounts of structural component substrate second material (into the structural component substrate first material 21a) configured as plurality of rectangles, that can be a form of rectangles shown as squares, with the squares having a common center point 24. FIG. 4C illustrates an exemplary geometric pattern 20c formed into induced pattern 22c by introducing amounts of structural component substrate second material (into the structural component substrate first material 21a) configured as plurality of substantially concentric circles having a common center point 24. FIG. 4D illustrates an exemplary geometric pattern 20d formed into the induced pattern 22d by introducing amounts of structural component substrate second material (into the structural component substrate first material 21a) with the induced pattern configured as a predetermined, irregular pattern. FIG. 4E illustrates an exemplary geometric pattern 20e formed into induced pattern 22e by introducing amounts of structural component substrate second material (into the structural component substrate first material 21a) with the induced pattern configured as a plurality of rays extending from a common central point 24 and radiating outward from the common central point 24. FIG. 4F illustrates an exemplary geometric pattern 20f formed into induced pattern 22f by introducing amounts of structural component substrate second material (into the structural component substrate first material 21a) with the induced pattern configured as a plurality of non-linear lines (shown in FIG. 4F as "wave-forms").

Figure 4G:
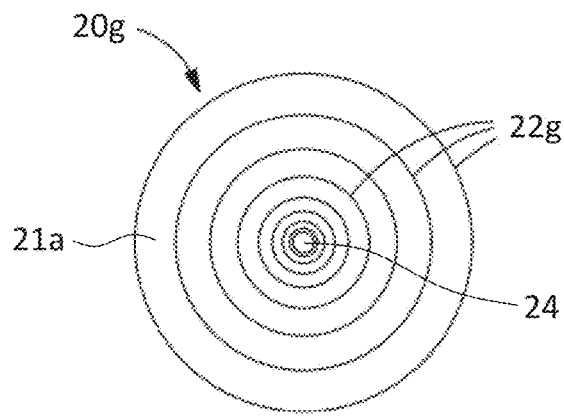

According to present aspects, the spacing of the structural component substrate sub-surface second material in the selected induced patterns in a selected induced pattern region can be varied according to a selected material deposition regimen to achieve the selected spacing. For example, FIG. 4G illustrates a geometric pattern 20g formed into induced pattern 22g by introducing amounts of structural component substrate second material (into the structural component substrate first material 21a) with the induced pattern 22g configured as a plurality of substantially concentric rings or circles with successive rings having a varying radius, and with the rings having a common center point 24. As shown in FIG. 4G, the distance between any two rings can vary by a differing known and selected distance, if desired. Similarly, the selected distance between induced segments or features comprising the structural component substrate second material (such as that shown in any of FIGS. 4A-4G, can vary by a differing known and selected distance, and the width or area consumed by the induced segments can be equivalent to one another, or the width or area consumed by the induced segments can vary from one or more of each of the other induced segments in the induced pattern.

The area of an induced pattern with a smaller spacing distance between induced pattern segments comprising the structural component substrate second material, (that can comprise a higher concentration of such induced pattern segments within the induced pattern) can be more responsive/sensitive to incurred forces and incurred force changes such as, for example, strain in the structural component, and changes in the induced spacing distances (e.g., due to incurred force changes, etc.) can produce a more intense response (e.g., degree and amount of refraction from the structural component substrate sub-surface under interrogation) in terms of, for example, refracted energy wavelengths in the area of interest having the induced pattern than at areas of the induced pattern region having greater spacing distances.

In further aspects, induced patterns can further comprise geometric patterns with segments of the induced pattern introduced into (e.g., laid up, or otherwise co-manufactured with and into) the structural component substrate first material, for example, at angles with respect to one another with or without the induced pattern segments differing in segment widths or dimensions for the purpose of independently monitoring, detecting, for example, differing levels or various types of strain occurring in the structural component.

According to present aspects, during inspection, strains such as radial strains can be interrogated by directing and delivering energy waves having a predetermined and selected wavelength or wavelength range (or, in the case of ultrasound, at a particular frequency, etc.) into the structural component to impact the induced pattern region with the induced pattern region comprising an induced pattern comprising pattern segments and spacing of pattern segments dimensioned and otherwise oriented to produce a response that can be correlated to existing strain in the structural component.

FIG. 5 shows a partially exposed view of a structural component substrate 100 comprising a sub-surface induced pattern 102 induced into the structural component substrate sub-surface induced pattern region 104. As shown in FIG. 5, the induced pattern 102 comprises a structural component substrate second material 14b having a second density introduced into the structural component substrate first material 14a having a first density.

The induced patterns, according to present aspects, can be incorporated into the presently disclosed non-destructive inspection systems. FIG. 6 outlines an exemplary non-destructive inspection system 110, according to present aspects, for assessing strain in, for example, a structural component of at least the type shown in the present FIGS. (e.g., structural component substrate 12, 100 shown in FIG. 2A, 2B, 2C, 5, 7, or 8). In accordance with present aspects, non-destructive inspection system 110 can include controller 112 that is capable of processing information received from monitoring and control devices using software that can be stored, for example, at controller 112, and outputting command and control signals to devices of the inspection system 110. The controller 112 can include a processor 114 for executing a specified program that controls and monitors functions associated with the non-destructive inspection system 110. The processor 114 can be operatively connected to a memory 116 that can have a read only memory (ROM) 118 for storing programs, and a random access memory (RAM) 120 serving as a working memory area for use in executing a program stored in the ROM 118.

Although the processor 114 is shown as a discrete feature, it is also possible and contemplated to use other electronic components such as a microcontroller, an application specific integrated circuit (ASIC) chip, or any other integrated circuit device. While the discussion provided herein relates to the functionality of the non-destructive inspection system 110, the controller 112 can be configured to control other aspects of operation of other systems. Moreover, the controller 112 can refer collectively to multiple control and processing devices across which the functionality of the inspection system 110 and other systems can be distributed.

For example, portions of the functionality of the non-destructive inspection system 110 can be performed at a remote computing device 122 having a controller 124 that is operatively connected to the controller 112 by a communications module 126 of the non-destructive inspection system 110. The remote computing device 122 can be located in a centralized location for an enterprise using the non-destructive inspection system 110 to perform inspections on mechanical systems. The controllers 112, 124 can be operatively connected to exchange information as necessary to control the operation of the non-destructive inspection system 110. Other variations in consolidating and distributing the processing of the controllers 112, 124 as described herein are contemplated as having use in inspection systems 110 in accordance with the present disclosure.

The non-destructive inspection system 110 can further include one or more ultrasonic or electromagnetic (EM) energy sources 128, 130 capable of projecting energy at selected wavelengths or at selected ultrasound frequencies corresponding to selected features in the selected geometric pattern present in the induced pattern of the induced pattern region, for example.

The energy sources 128, 130 can receive control signals from the processor 114 causing the energy sources 128, 130 to project energy at selected wavelengths. In some embodiments, each energy source 128, 130 can be capable of projecting energy at one wavelength. In alternative aspects, each energy source 128, 130 or a single energy source can project energy at different wavelengths. While the energy sources 128, 130 are illustrated and described as being operatively connected to the processor 114, the energy sources 128, 130 can be standalone devices having associated input devices such as on/off switches, wavelength selection inputs and the like for manual control of the operation by personnel performing an inspection.

The non-destructive inspection system 110 also can include an energy detector 132 operatively connected to the processor 114. The energy detector 132 can be any device capable of detecting a deflected wavelength of the energy reflected, diffracted, refracted (with the terms "reflected energy wavelengths", "diffracted energy wavelengths", and "reflected energy wavelengths" referred to collectively and equivalently herein as "deflected energy wavelengths"), or otherwise transmitted from the geometric pattern present in the induced pattern of the induced pattern region from a sub-surface region of a structural component substrate when energy from the energy sources 128, 130 is projected onto the geometric pattern.

In the present aspects illustrated herein, the energy detector 132 can be an optical detector capable of detecting the deflected wavelength of the energy reflected, diffracted, refracted wavelength of the deflected or transmitted energy. For example, the energy detector 132 can be a charge-coupled device (CCD) camera, a video camera, photographic film or other energy-sensing apparatus. When activated by the processor 114 or manually actuated by appropriate input devices, the energy detector 132 can, for example, capture the deflected energy and transmit a representation of the detected diffracted wavelengths of, for example, the diffracted energy to the processor 114. Once received, the processor 114, for example, can store diffracted wavelengths in the memory 116. Detection of the wavelengths or frequencies of the deflected energy and determinations of variations in, for example, the diffracted wavelengths or frequencies can be achieved using alternative mechanisms as desired or necessitated by a particular implementation of the systems and methods described herein, and the use of such alternative mechanisms is contemplated herein. Accordingly, use of other mechanisms for detection and analysis of, for example, the diffracted wavelengths of the diffracted energy has equal application in the systems and methods of the present disclosure.

The inspection system 110 can have one or more input devices 134 adjustable, for example, by an operator to control the inspection process. The input device 134 can include switches, buttons, keyboards, mice, touchscreens and the like capable of receiving input commands from an operator. Output devices 136, such as monitors, screens, touchscreens, speakers, printers, and the like may convey information from the inspection system 110 to the operator.

An exemplary implementation of a non-destructive inspection system 110a is illustrated in FIG. 7. As shown in FIG. 7, the processor 114, the energy source 128 and the energy detector 132 are integrated in an inspection workstation 140. The inspection workstation 140 can be, for example, a workstation at a maintenance facility for the mechanical system of which the structural component at least of the type of structural component substrate 12, 100 shown at least in FIG. 2A, 2B, 2C, 5, 6, or 8. With the structural component substrate 12 disposed at the inspection workstation 140, the energy source 128 can be activated to project beams 142 of energy (with the term "beam" including the term "wave" herein as it pertains to ultrasonic energy herein) at the appropriate selected wavelength or frequency onto the geometric pattern of an induced pattern formed by the structural component substrate second material 14b in the structural component substrate first material 14a. The projected beams 142 are, for example, diffracted by the geometric pattern to produce beams 144 of, for example, diffracted energy. The energy detector 132 receives and detects the beams 144 of diffracted energy and transmits the detected energy to the processor 114 for analysis and correlation of the detected diffracted wavelengths or frequencies of the reflected beams 144 of energy into corresponding strain values. The processor 114 may be programmed with algorithms known in the art for performing the conversion of the detected wavelengths or frequencies into strain values. As shown in FIG. 7, the non-destructive inspection system 140 illustrates a system where the energy source and the detector are located on the same side of a structural component being investigated. The energy source can be an electromagnetic (EM) energy source or an ultrasound energy source, with the associated detector configured to detect the type of energy (e.g., in the form of beams or waves, etc.) provided or emitted by the selected energy source. The energy source 128 can further comprise multiple energy source types, or non-destructive inspection system, according to present aspects can comprise multiple energy sources (not shown in FIG. 7), with one system energy source being, for example an electromagnetic energy source (e.g. a terahertz energy source) and another system energy source being an ultrasonic energy source. The induced patterns comprising the structural component substrate second material having a second density that is different from the surrounding structural component substrate first material first density, as shown in FIG. 7, can be formed in the structural component using any appropriate manufacturing technique, including, for example, additive manufacturing.

FIG. 8 illustrates an alternative implementation, according to present aspects, of a non-destructive inspection system 110b where the energy source 128 and the energy detector 132 are components of a portable inspection device 150, and the processor 114 and the memory 116 are located at a central inspection workstation 152. The portable inspection device 150 can be a laptop computer, a tablet, a smart phone, a personal digital assistant, or other portable processing device. The portable inspection device 150 can further include a communications module 154 capable of wireless communications with the communications module 126 at the central inspection workstation to transmit the detected colors from the energy detector 132. The energy can be projected from the energy source 128 and detected by the energy detector 132 in a similar manner as illustrated and described for FIG. 7. The energy source can be an electromagnetic (EM) energy source or an ultrasound energy source, with the associated detector configured to receive and detect the type of energy (e.g., in the form of beams or waves, etc.) provided or emitted by the energy source. The induced patterns comprising the structural component substrate second material having a second density that is different from the surrounding structural component substrate first material first density, as shown in FIG. 8, can be formed in the structural component using any appropriate manufacturing technique, including, for example, additive manufacturing. FIG. 8 outlines an exemplary non-destructive inspection system 110b, according to present aspects, for assessing strain in, for example, a structural component of at least the type shown in the present FIGS. (e.g., structural component substrate 12, 100 shown in FIG. 2A, 2B, 2C, 5, 6, or 7).

FIG. 8 further illustrates an implementation where an energy source 130 is positioned on the opposite side of the structural component substrate 12 from the detector 132 and the portable inspection device 150. The energy source 130 can be permanently mounted within a hard-to-reach location within the mechanical system. As shown, the energy source 130 can project beams or waves 142 of transmitted energy (e.g., EM energy or ultrasonic energy) onto the structural component substrate 12 and the geometric pattern. The energy can be diffracted by the induced pattern formed by the structural component substrate sub-surface second material 14b with a second density value in the structural component substrate first material 14a (that has a first density value and with the first and second density values differing from one another) in the structural component 12. The energy is transmitted (e.g., from a transmitter, etc.) through the structural component substrate 12 in beams 142 (e.g., in the case of EM energy or waves e.g., in the case of ultrasonic energy waves). The beams 144 of, for example, diffracted energy are received at the energy detector 132 on the opposite side of the structural component substrate 12 and processed by the processor 114.

FIG. 9 illustrates an exemplary non-destructive inspection routine 160 that can be performed by the non-destructive inspection systems 110, 110a, 110b on a structural component substrate at least of the type shown at least in FIG. 2A, 2B, 2C, 5, or 8 as structural component substrate 12, 100. The routine 160 can begin at a block 162 where the structural component is created (e.g., fabricated) with one or more of the geometric patterns (e.g., 20a, 20b, 20c, 20d, 20d, 20e, 20f, 20g shown in FIGS. 4A, 4B, 4C, 4D, 4E, 4F, and 4G, respectively) induced into the induced pattern region created in the structural component substrate first material induced into the structural component substrate first material within the structural component. The induced patterns comprising the structural component substrate second material having a second density that is different from the surrounding structural component substrate first material first density can be formed in the structural component using any appropriate manufacturing technique, including, for example, additive manufacturing. After the structural component is created with the predetermined geometric pattern, control can pass to a block 164 where the energy source 128 projects the beam or wave 142 of energy (e.g., EM energy or ultrasonic energy) with the corresponding wavelength or frequency at the structural component and onto the geometric pattern. The energy in the projected beams 142 is diffracted by the induced patterns comprising the structural component substrate second material having a second density, and corresponding energy with diffracted wavelengths is reflected/diffracted/refracted or otherwise transmitted from the geometric pattern of the induced pattern region. The reflected or transmitted beams 144 of energy can have diffracted wavelengths that vary at different locations on the geometric pattern due to changes in the induced patterns comprising the structural component substrate sub-surface second material having a second density, with the variance that is perceived by the system being caused by strain on the structural component.

With the beams 142 of energy projected onto the geometric pattern and being diffracted and reflected or transmitted, control can pass to a block 166 where the beams 144 of, for example, diffracted energy are detected by the energy detector 132 to detect the diffracted wavelengths. The diffracted wavelengths of the beams 144 of energy can be temporarily stored or permanently stored in the memory 116.

After the diffracted beams 144 of energy are detected, control can pass to a block 168 where the inspection system 110 can determine whether energy with a specified energy wavelength or frequency has been projected onto the geometric pattern. As discussed above, some implementations can have a geometric pattern with one or more first induced pattern segment(s) with a first width onto which a first beam 142 of energy having a first wavelength is projected, and one or more second induced pattern segment(s) with a second width onto which a second beam 142 of energy having a second wavelength is projected. In these implementations, it may be necessary to project only beams 142 with one wavelength at a time. Consequently, if it is determined at the block 168 that beams 142 of energy having the various wavelengths have not been projected onto the geometric pattern, control can pass back to the blocks 164, 166 to project energy from the energy source 128, 130 with a different wavelengths or different frequency onto the geometric pattern and detect the corresponding diffracted wavelengths in the beams 144 of energy for the next projected beam 142, as described above.

If beams 142 of energy with the predetermined wavelengths or frequencies have been projected and the diffracted beams 144 of energy have been detected at the block 168, control can pass to a block 170 where the diffracted wavelengths of the beams 144 are correlated to strains in the structural component. As discussed above, the processor 114 can be programmed with algorithms known in the art for correlating the wavelengths and frequency of the energy in the diffracted beams 144 into strain values.

After the strain values are determined for the diffracted beams 144 of energy at the block 170, control can pass to a block 172 to determine whether strain values calculated from the diffracted wavelengths in the diffracted beams 144 of energy, for example, exceeds or deviates from a minimum or maximum predetermined strain value indicating (e.g., triggering) that further inspection or maintenance should be performed. According to present aspects, certain levels of strain are acceptable in a structural component. As an alternative, the detected (e.g., actual or assessed) strain value may be compared to baseline (e.g., reference) strain values obtained for the structural component and structural component substrate before the mechanical system is placed in service and exposed to environmental conditions. The baseline strain values in the geometric pattern can be established by projecting the beams 142 on the structural component when no strain is placed on the structural component, or when a known strain is placed on the structural component to determine the diffracted wavelengths in the beams 144 in response. In other aspects, a portion of the geometric pattern can be applied in an area that will not experience strains during exposure to the environmental conditions, and the diffracted wavelengths from the non-strained area can establish real-time dynamic baselines at the time the inspection is performed.

A comparison may be made between the currently detected strain values and the baseline or other previously determined strain values (e.g., baseline or reference strain values from an accessible memory, etc.) to determine whether the current strain values differ from the previous strain values by more than a minimum amount or percentage. If the strain values are not greater than the minimum strain value and further inspection is not otherwise required, control can pass to a block 174 where the structural component is exposed to environmental conditions. The exposure can come from normal use in the normal environment of the mechanical system. Where the mechanical system is in a development stage, the environmental conditions can be applied in a test environment. After the exposure at the block 174, control can pass back to the block 164 to initiate another instance of non-destructively inspecting the structural component. Strain values being greater than the minimum strain value at the block 172 can indicate that further inspection, maintenance, reworking, replacement, etc., of the structural component may be necessary. If strain values are greater than the minimum strain value at the block 172, control passes to a block 176 to conduct further inspection of the structural component.

The inspection routine 160 of FIG. 9 is an example of a quantitative process for evaluating the strain in the structural components at least of the type shown, for example, in at least FIG. 2A, 2B, 2C, 5, 6, 7, or 8 and identifying when further inspection, maintenance, reworking, replacement, etc., may be required. In some implementation, it may be appropriate to substitute for, or supplement, the quantitative inspection routine 160 with a qualitative process wherein the experience of inspectors performing the inspection may be used to analyze a strain pattern in the structural components and identify abnormalities in the strain pattern that merit further inspection.

FIG. 10 illustrates an exemplary qualitative inspection routine 180 that can be performed on the structural components and structural component substrates at least of the type shown, for example, at least in FIG. 2A, 2B, 2C, 5, 6, 7, or 8 by the inspection systems 110, 110a, 110b, and an inspector, engineer, or other inspection technician using the inspection system 110, 110a, 110b. The inspection routine 180 can begin in a similar manner as the inspection routine 160 wherein a structural component substrate 12 is created with induced pattern in the induced pattern region having a geometric pattern shown, for example, in FIGS. 4A-4G. At the block 162, beams or waves 142 of energy are projected onto the structural component at the block 164, beams or waves 144 of, for example, diffracted energy are detected at the block 166, and the diffracted wavelengths from the beams or waves 144 of diffracted energy are correlated to strains in the structural component at the block 170.

To implement the inspection routine 180, the inspection system 110, 110a, 110b can be modified at blocks 164, 166, 170 to identify locations of the beams/waves 142, 144 relative to the inspected structural component as the beams 142 are projected over the surface of the structural component. Known techniques for determining locations and movements of a body or device such as the structural component substrate 12 as it moves relative to the inspection workstation 140 of FIG. 10 or the portable inspection device 150 of FIG. 8 as it moves past the surface of the structural component substrate 12 (e.g., rastering, etc.). The location information for the beams 144 of diffracted energy can be stored at the memory 116 along with the diffracted wavelengths detected at the block 166 and the correlated strain values determined at the block 170.

After the diffracted wavelengths are detected and the strain values are determined, or dynamically as the inspection system 110, 110a, 110b is inspecting the structural component, control can pass to a block 182 where the diffracted wavelengths, the strain values and the locations of the beams 144 relative to the structural component can be used to generate and display a strain pattern for the inspected structural component.

FIG. 11 illustrates an example of a display 200 of an exemplary strain pattern 202 that can be derived from the information acquired by the inspection system 110, 110a, 110b. The display 200 can be any appropriate visual display that conveys a graphical representation of the strains in the structural component. including at least the type of structural component substrate 12 shown at least in FIG. 2A, 2B, 2C, 5, 6, 7, or 8. For example, the display 200 can be a video display at one of the output devices 136 at the inspection workstation 140, the portable inspection device 150, the central inspection workstation 152 or other location where an inspector may view the display 200. In alternative aspects, the display 200 can be a printout output by one of the output devices 136 at an appropriate location. Further, alternative visual display output devices 136 for displaying the strain pattern 202 can be implemented, and are contemplated by the presently disclosed aspects.

The strain pattern 202 is a visual representation of the distribution of strain values across the inspected structural component. In the illustrated example, the display of the strain pattern 202 utilizes grayscale shading to depict the locations and magnitudes of the strain values in the structural component. White or lighter gray shades can indicate low strain areas, and the gray shading can darken as the strain values increase. The spacing between the shaded areas provides an indication of the rate of change of the strain values across the structural component. In alternative aspects, the strain pattern can be color coded. For example, "blue" can correspond to low strain values, and the colors can be configured to progress through the color spectrum to "red" to represent high strain values. In other aspects, the strain pattern can be presented as lines of constant strain values having appearances resembling, for example, weather maps showing barometric pressure changes or topographical maps showing elevation changes. Further alternative depiction and display output strategies are contemplated.

In some present aspects, where grayscale or the color spectrum are used, a scale can be added to the display 200 to indicate the strain values corresponding to the various shades or colors in the strain pattern 202. The display 200 can further display a minimum strain value at minimum strain area 204, and a maximum strain value at a maximum strain area 206. The display 200 can further be enhanced by displaying the strain pattern 202, for example, overlaying a captured image or graphical representation of the structural component and with the ascertained strain pattern positioned on the image to more clearly illustrate the location of the strain pattern on the structural component.

With the strain pattern 202 generated and displayed on the display 200 at the block 182, control can pass to a block 184 where an inspector, maintenance person or other technician may review the strain pattern 202 to determine whether the strain pattern 202 is normal for the environmental conditions to which the structural component has been subjected. The inspector may reference their experience in inspecting the current and/or other structural components in evaluating whether the strain pattern 202 has the characteristics that should be expected, or whether the strain pattern 202 indicates that issues may exist requiring additional inspection. The evaluation can include reviewing baseline information accessed and collected for the structural component of the type discussed above. The baseline information can be presented in any appropriate format. In some implementations, the baseline information can be used to generate a baseline strain pattern that can be displayed at the display 200 as a supplement to the real-time strain pattern 202 to provide a visual comparison. Further, if an inspector determines at the block 184 that the strain pattern 202 is normal, the strain values illustrated in the strain pattern 202 are not greater than or less than strain values that would indicate issues exist, and further inspection is not otherwise required, control can pass to the block 174 where the structural component is exposed to environmental conditions as discussed herein. After the exposure at the block 174, control can pass back to the block 164 to initiate another instance of inspecting the structural component. The strain pattern 202 being different than expected in strain values that are either greater than expected or less than expected at the block 184 can indicate that further inspection, maintenance, reworking, or replacement of the structural component is necessary. If the strain pattern 202 is not normal relative to an expected strain pattern for the structural component at the block 184, control passes to the block 176 to conduct further inspection of the structural component. As discussed above, the qualitative inspection routine 180 can be implemented as either an alternative or a supplement to the quantitative inspection routine 160 of FIG. 11.

The inspection system 110, 110a, 110b, and the routine 160 can have broad application in assessing the structural integrity of structural components, including the sub-surface integrity, in mechanical systems. For example, the non-destructive inspection system 110, 110a, 110b, and the routine 160 can be used in a rework or other maintenance or monitoring application to ensure the quality of an original bond (or a bond rework) of a structural component, including, for example, the response of the structural component to stress and strain over time, e.g., before the structural component is reworked or replaced, etc. If the geometric pattern is created is applied to the structural component and located proximate to a bond line and/or a bond line region present in, for example, a multi-layer structural component, strains due to bonding changes or initial bonding defects (e.g., delamination, etc.) can be imaged and analyzed according to the routine 160 to detect residual stresses and the quality of the bonding within the structural component. A baseline image of a structural component before the structural component is exposed to environmental conditions can show initial strain in the structural component, and periodic imaging after the structural component is exposed to environmental conditions can monitor the quality and integrity of, for example, internal bonds, etc., and otherwise indicate degradation within a structural component over time.

According to present aspects, an induced pattern region can be induced at a bond line or bond line region, with the understanding that the introduction of structural component substrate materials having varying and measurable density difference will not adversely impact the desired bonding levels (e.g., will not reduce bonding strength, contribute to delamination, etc.). Adhesive layers, that can comprise bond lines and bond line regions, occur at a sub-surface region within a structural component, according to present aspects. When materials are added to form one or more induced pattern regions in structural component substrate sub-surface regions (e.g., added via additive manufacturing, etc.), the period of the added material in the geometric or otherwise induced patterns are selected to occur in the wavelength range of an actual diffracted signal of interest. Periods are further selected that can match an appropriate wavelength of energy. As a frequency of applied energy is decreased (e.g., lowered), the energy will penetrate more deeply into a structural component substrate sub-surface regions.

With respect to electromagnetic energy sources, while present aspects contemplate the use of Terahertz wavelengths, short-, mid- and long-infrared (IR) wavelengths of electromagnetic energy may, depending upon the substrates being interrogated be used as the energy source, and, in some instances, microwaves, are preferred, according to present aspects, to accomplish the deeper energy wave penetration into structural component substrate sub-surface regions.

According to present aspects, strain values derived through the presently disclosed non-destructive inspection system 110, 110a, 110b and the routine 160 can be input into a finite element analysis (FEA) model of the structural component and analyzed to provide performance assessments, prospective inspection schedules, predictive maintenance, rework plans, etc., of a structural component.

The non-destructive inspection system 110, 110a, 110b and the routine 160 can have application in structural testing environments. Manufacturers typically conduct subscale, mid-scale and full-scale structural testing of components and repairs to ensure proper performance in the field. Such testing can involve static and dynamic loading conditions. Several techniques are currently used in this type of structural testing. For example, strain gauges can be applied to structural components as point sensors for monitoring stress and strain during the tests, but their effectiveness in detecting locations in which damage to the structural component initiates and propagates is dependent on where the strain gauges are placed on the structural component. Digital Image Correlation (DIC) may be used to provide stream mapping during structural testing, but the process can be expensive, require expertise in operation, and necessitate spraying a speckled pattern on the surface. Consequently, DIC may be used judiciously in structural testing.

According to present aspects, the inspection system 110, 110a, 110b and the routine 160 can be used as an alternative or a supplement to the currently-used testing techniques and can be used to monitor and measure real-time strain patterns throughout the test loading conditions. The detected strain patterns can be used to correlate analysis models, and to point to or indicate initial failure locations in the structural component being tested. As in the repair monitoring application, direct feed of the strain information into the FEA tools can provide real-time and/or load-level damage growth information. The damage initiation and growth information can be used to improve the structural models of the structural components and modify the structural designs.

According to present aspects, the inspection system 110, 110a, 110b and the routine 160 can be used to improve the fabrication process of composite components that are becoming more prevalent in mechanical systems and including aerospace systems. During manufacturing development and periodic process monitoring and fabrication of composite components, it may be beneficial to determine and track internal strains in the composite component that are created by the fabrication of the component. The internal strains can be tracked through the use of strain indicator plies in a composite component that are configured with geometric patterns. To create the strain indicator plies, a geometric patterns such as those of the type disclosed herein can be applied to the resin in selected plies during fabrication as an additional resin layer sprayed onto the ply that is subsequently configured with the geometric pattern, or as an applique that forms a peelable ply that may be removed after the composite component is cured. The patterned strain indicator plies will show residual stresses and strains that exist in the composite component due to the curing process. The information from the patterned strain indicator plies can be used to modify the manufacturing process of the composite component to reduce warpage, predict performance and verify that the production process is still within specification.

The inspection system 110, 110a, 110b and the routine 160 can also have application in monitoring the structural health of structural components disposed in limited access areas of their mechanical systems. For, example, limited access structures on aircraft and other mechanical systems can be critical to structural integrity and can experience high loading. Structural health testing of such limited access structures has previously necessitated costly disassembly and reassembly processes. According to present aspects, strain witness surfaces in the form of the geometric patterns can be created at strategic locations within the limited access structural components during fabrication. Optical or video borescopes or small cameras and extending mechanisms can function as the energy source 128 or 130 and the energy detector 132 in the inspection system 110 and can be used to detect the diffracted wavelengths in the transmitted energy from the geometric patterns on the limited access structures and allow analysis of the diffracted wavelength data to detect degradation of the components and monitor slow damage growth until a repair is needed, for example.

As discussed above in relation to at least FIG. 8, the energy source 130 or the energy detector 132 can be permanently mounted within a limited access space or deployed during inspection in a manner that does not require complete disassembly of the structural component. That is, according to present aspects, one of the energy source 130 and the energy detector 132 can be positioned on the opposite side of the structural component to detect the transmitted beams 144 of energy. For example, a small transmitter can be located on an inner surface of a structural component where limited access occurs with a structure, with the energy emitted from an inner location in a direction through the inner surface, into a sub-surface region comprising an induced pattern region toward detectors located beyond the outer surface of a structural component. Where access allows, the energy inspection can be combined with other non-destructive inspection methods, such as, for example, infrared thermography or terahertz imaging, to provide an improved assessment and disposition of the limited access components. This and the foregoing applications of the inspection system 110, 110a, 110b and the routine 160 are exemplary, and additional applications are contemplated by the inventors.

FIGS. 12, 13, and 14 are flowcharts outlining non-destructive methods for determining strain in a structural component and structural component substrates of the types shown, for example, in FIG. 2A, 2B, 2C, 5, 6, 7, or 8, according to present aspects. FIG. 12 illustrates an exemplary method 1200 for non-destructively assessing strain in a structural component and structural component substrate, with the method 1200 including emitting 1202 an energy wave from an energy source at a first wavelength, delivering 1204 the energy wave from the energy source at the first wavelength to a structural component substrate sub-surface region of the structural component, with the structural component substrate sub-surface region comprising a structural component substrate first material having a first density, with the structural component substrate sub-surface region further comprising an induced pattern region, with the induced pattern region comprising a structural component second material having a second density, and with the first density differing from said second density. According to method 1200 energy is deflected from the induced pattern region in the form of a deflected energy wave to generate at least one of: a diffraction response, a refraction response, and a reflection response, with the method further including detecting 1206 the deflected energy from the induced pattern region at a detector, and correlating 1208 at least one of: the diffraction response, the refraction response, and the reflection response from the induced pattern region to strain present in the structural component substrate sub-surface region.

FIG. 13 illustrates an exemplary method 1300 for non-destructively assessing strain in a structural component and structural component substrate, with the method 1300 including emitting 1202 an energy wave from an energy source at a first wavelength, delivering 1204 the energy wave from the energy source at the first wavelength to a structural component substrate sub-surface region of the structural component, with the structural component substrate sub-surface region comprising a structural component substrate first material having a first density, with the structural component substrate sub-surface region further comprising an induced pattern region, with the induced pattern region comprising a structural component second material having a second density, and with the first density differing from said second density. According to method 1200 energy is deflected from the induced pattern region in the form of a deflected energy wave to generate at least one of: a diffraction response, a refraction response, and a reflection response, with the method further including detecting 1206 the deflected energy from the induced pattern region at a detector, accessing 1302 a reference strain value for the structural component substrate sub-surface region, obtaining 1304 an actual detected strain value for at least a portion of the structural component, comparing 1306 the reference strain value to the obtained actual strain value, and correlating 1208 the detected strain value present with the reference strain value to determine strain present in at least a portion of the structural component including the strain present in at least a portion of the structural component substrate sub-surface region and the induced pattern region based on the response from the induced pattern and induced pattern region.

FIG. 14 illustrates an exemplary method 1400 for non-destructively assessing strain in a structural component substrate sub-surface region, with the method 1400 including emitting 1202 an energy wave from an energy source at a first wavelength, delivering 1204 the energy wave from the energy source at the first wavelength to a structural component substrate sub-surface region of the structural component, with the structural component substrate sub-surface region comprising a structural component substrate first material having a first density, with the structural component substrate sub-surface region further comprising an induced pattern region, with the induced pattern region comprising a structural component second material having a second density, and with the first density differing from said second density. According to method 1200 energy is deflected from the induced pattern region in the form of a deflected energy wave to generate at least one of: a diffraction response, a refraction response, and a reflection response, with the method further including detecting 1206 the deflected energy from the induced pattern region at a detector, accessing 1402 a reference strain value for at least a portion of the structural component substrate sub-surface region, obtaining 1404 an actual detected strain value for at least a portion of the structural component substrate sub-surface region, and determining 1406 the strain present in at least a portion of the structural component including the strain present in at least a portion of the structural component substrate sub-surface region and the induced pattern region based on the response from the induced pattern and induced pattern region.

FIG. 15 is a flowchart illustrating an exemplary method 1500, according to present aspects, for fabricating a structural component, with the method 1500 including providing 1502 a structural component substrate first material, with the structural component substrate first material having a first known density, and inducing 1504 a pattern region into the structural component substrate material to form an induced pattern region, with the induced pattern region comprising structural component second material, with the structural component second material having a second density, and with the first density differing from said second density. The method 1500 further includes constructing the structural component by forming 1506 a structural component material sub-surface region, wherein said structural component material sub-surface region comprises the induced pattern region. According to FIG. 15, the method 1500 can further include additively manufacturing 1508 the induced pattern region into the structural component substrate material. The first density can be greater than or less than the second density.

The present aspects can be carried out in other ways than those specifically set forth herein without departing from essential characteristics of the disclosure. The present aspects are to be considered in all respects as illustrative and not restrictive, and all changes coming within the meaning and equivalency range of the appended claims are intended to be embraced therein.

What is claimed is:

1. A method for non-destructively assessing strain in a structural component substrate sub-surface region, said method comprising:
   emitting an ultrasonic energy wave from an energy source at a first wavelength;
   delivering the ultrasonic energy wave from the energy source at the first wavelength to the structural component substrate sub-surface region of a structural component substrate, said structural component substrate sub-surface region comprising a structural component substrate first material comprising a first density, said structural component substrate sub-surface region further comprising an induced pattern region that is intentionally interspersed within and amidst the structural component substrate sub-surface region as a part of the structural component substrate sub-surface region, said induced pattern region comprising a structural component substrate second material comprising a second density, said first density differing from said second density;

directing the ultrasonic energy wave from the induced pattern region of the structural component sub-surface region in the form of a deflected energy wave to generate at least one of a diffraction response, a refraction response, and a reflection response;

detecting the deflected ultrasonic energy wave from the induced pattern region at a detector;

obtaining a detected strain value for at least a portion of the structural component substrate sub-surface region; and correlating at least one of the diffraction response, the refraction response, and the reflection response from the induced pattern region to strain present in the structural component substrate sub-surface region.

2. The method of claim 1, wherein the induced pattern region further comprises a predetermined geometric pattern.

3. The method of claim 1, further comprising:
accessing a reference induced pattern value;
obtaining a detected induced pattern value; and
comparing the reference induced pattern value to the detected induced pattern value.

4. The method of claim 1, further comprising:
accessing a reference strain value for the structural component substrate sub-surface region.

5. The method of claim 4, further comprising:
correlating the detected strain value with the reference strain value to determine strain present in at least a portion of the structural component substrate sub-surface region.

6. The method of claim 4, further comprising:
determining a strain present in at least a portion of the structural component substrate sub-surface region.

7. The method of claim 1, further comprising:
determining when at least a portion of the structural component substrate sub-surface region requires rework to eliminate detected strain in the at least a portion of the structural component substrate sub-surface region.

8. The method of claim 1, wherein the structural component comprises a multi-layer structural component.

9. The method of claim 1, wherein the structural component substrate sub-surface region comprises a cured adhesive material layer, said cured adhesive material layer comprising a bond line region, and wherein said cured adhesive material layer comprises the induced pattern region.

10. A non-destructive inspection system for detecting deformation in a structural component sub-surface region, the non-destructive inspection system comprising:
an ultrasonic energy source configured to emit a first energy wave at an emitted energy wave first wavelength, said ultrasonic energy source further configured to deliver the first energy wave emitted at the emitted energy wave first wavelength to a structural component substrate, said structural component substrate comprising a structural component substrate sub-surface region, said structural component substrate sub-surface region comprising:
a structural component substrate first material, said structural component substrate first material comprising a first density, said structural component substrate sub-surface region further comprising an induced pattern region, said induced pattern region comprising a structural component substrate second material comprising a second density, said first density differing from the second density;

a detector configured to receive a deflected energy wave from the structural component substrate sub-surface region to generate at least one of a diffraction response, a refraction response, and a reflection response;

a processor in communication with the detector, said processor configured to receive a signal from the detector, said processor further configured to compare the deflected energy wave with at least one of the emitted energy wave first wavelength, a reference diffraction response, a reference refraction response, and a reference reflection response;

wherein said processor is further configured to correlate the deflected energy wave to strain present in the structural component;

wherein the induced pattern region comprises a selected geometric pattern;

wherein the detector is configured to read a sub-surface structural material density profile; and wherein the non-destructive inspection system is configured to detect deformation in the structural component.

11. A structural component comprising:
a structural component substrate, said structural component substrate comprising a structural component substrate sub-surface region, said structural component substrate sub-surface region comprising a structural component substrate first material comprising a first density, said structural component substrate sub-surface region further comprising an induced pattern region, said induced pattern region comprising a structural component substrate second material, said structural component substrate second material comprising a second density;

wherein said first density is different from the second density; and wherein the induced pattern region comprises a geometric pattern, said induced pattern region further configured to receive a first ultrasonic energy wave from an ultrasonic energy source, said ultrasonic energy source configured to emit the first energy wave at an emitted energy wave first wavelength, said ultrasonic energy source further configured to deliver the first energy wave emitted at the emitted energy wave first wavelength to the structural component substrate;

wherein the structural component substrate further comprises a cured adhesive layer, said cured adhesive layer comprising a bond line region; and wherein the bond line region comprises the induced pattern region.

12. An object comprising the structural component of claim 11.

13. The object of claim 12, wherein the object comprises a vehicle.

14. The object of claim 13, wherein the vehicle comprises at least one of a crewed spacecraft, an uncrewed spacecraft, a crewed aircraft, an uncrewed aircraft, a crewed rotorcraft, an uncrewed rotorcraft, a crewed terrestrial vehicle, an uncrewed terrestrial vehicle, a crewed surface water borne vehicle, and uncrewed surface water borne vehicle, a crewed sub-surface water borne vehicle, and uncrewed sub-surface water borne vehicle, a hovercraft, a satellite, and combinations thereof.

15. The method of claim 1, wherein the structural component substrate further comprises at least one of a metal outer layer of a structural component first side and a metal outer layer of a structural component second side.

16. The method of claim 1, wherein the structural component substrate further comprises a structural component substrate outer surface, said structural component substrate outer surface comprising a non-planar surface.

17. The non-destructive inspection system of claim 10, wherein the structural component substrate further comprises at least one of a metal outer layer of a structural component first side and a metal outer layer of a structural component second side.

18. The structural component of claim 11, wherein the structural component substrate further comprises a structural component substrate outer surface, said structural component substrate outer surface comprising a non-planar surface.

19. The structural component of claim 18, wherein the structural component substrate further comprises at least one of a metal outer layer of a structural component first side and a metal outer layer of a structural component second side comprises a non-planar surface.

* * * * *